(12) United States Patent
Buma et al.

(10) Patent No.: US 7,543,823 B2
(45) Date of Patent: Jun. 9, 2009

(54) VEHICLE STABILIZER SYSTEM

(75) Inventors: Shuuichi Buma, Toyota (JP); Jaesung Cho, Toyota (JP); Daisuke Yamada, Anjo (JP)

(73) Assignees: Toyota Jidosha Kabushiki Kaisha, Toyota (JP); Aisin Seiki Kabushiki Kaisha, Kariya-shi (JP)

( * ) Notice: Subject to any disclaimer, the term of this patent is extended or adjusted under 35 U.S.C. 154(b) by 419 days.

(21) Appl. No.: 11/297,364

(22) Filed: Dec. 9, 2005

(65) Prior Publication Data

US 2006/0138732 A1 Jun. 29, 2006

(30) Foreign Application Priority Data

Dec. 28, 2004 (JP) ............................. 2004-381554

(51) Int. Cl.
*B60G 17/005* (2006.01)
(52) U.S. Cl. .................................. 280/5.502
(58) Field of Classification Search ............. 280/5.502, 280/5.506, 5.507, 5.509, 5.511, 124.106, 280/124.107, 5.517, 5.518; 267/188; 701/37, 701/38, 41, 82, 90; 318/55, 56, 66, 68, 273, 318/274
See application file for complete search history.

(56) References Cited

U.S. PATENT DOCUMENTS

| | | | |
|---|---|---|---|
| 4,616,848 A * | 10/1986 | Sugasawa et al. | 280/5.518 |
| 4,796,911 A * | 1/1989 | Kuroki et al. | 280/5.511 |
| 5,793,178 A | 8/1998 | Biais | |
| 5,872,435 A | 2/1999 | Bolte et al. | |
| 6,137,253 A | 10/2000 | Galbiati et al. | |
| 6,425,585 B1 | 7/2002 | Schuelke et al. | |
| 7,322,580 B2 * | 1/2008 | Suzuki et al. | 280/5.502 |
| 2003/0227271 A1 | 12/2003 | Shindo | |
| 2005/0023789 A1 | 2/2005 | Suzuki et al. | |
| 2005/0179220 A1 | 8/2005 | Yasui et al. | |
| 2006/0249919 A1 * | 11/2006 | Suzuki et al. | 280/5.511 |

FOREIGN PATENT DOCUMENTS

| | | |
|---|---|---|
| DE | 102 39 657 B3 | 4/2004 |
| EP | 0 955 721 A1 | 11/1999 |
| EP | 1 426 208 A | 6/2004 |
| EP | 1 491 371 A | 12/2004 |
| EP | 1 564 043 A2 | 8/2005 |
| JP | A 2000-71738 | 3/2000 |
| JP | A 2002-518245 | 6/2002 |
| JP | A 2004-98952 | 4/2004 |

OTHER PUBLICATIONS

Yonekawa et al., "Effect of Active Control Suspension on Vehicle Dynamics." *JSAE Review*, vol. 12, No. 2, pp. 40-45, Apr. 1991.

* cited by examiner

*Primary Examiner*—John Q. Nguyen
*Assistant Examiner*—Robert A. Coker
(74) *Attorney, Agent, or Firm*—Oliff & Berridge, PLC

(57) ABSTRACT

A stabilizer system for a vehicle including: a stabilizer bar connected to left and right wheels at respective opposite ends thereof; an actuator which has an electric motor and which changes elastic force to be exhibited by the stabilizer bar, as a result of control of an operation of the electric motor; and a control device which controls the operation of the electric motor, wherein the control device includes an operation-mode changing portion which changes an operation mode of the electric motor that depends on a motor-phase-connecting formation and a power-supply status of the electric motor, on the basis of at least one of a vehicle running state and road surface condition.

12 Claims, 16 Drawing Sheets

FIG.6

| | | WLC | VLS | ULC | WHC | VHC | UHC |
|---|---|---|---|---|---|---|---|
| CONTROL MODE | CCW ROTATION | 0 | 0 | 1 * | 0 | 1 | 0 |
| | | 0 | 0 | 1 * | 1 | 0 | 0 |
| | | 0 | 1 * | 0 | 1 | 0 | 0 |
| | | 0 | 1 * | 0 | 0 | 0 | 1 |
| | | 1 * | 0 | 0 | 0 | 0 | 1 |
| | | 1 * | 0 | 0 | 0 | 1 | 0 |
| | CW ROTATION | 0 | 1 * | 0 | 0 | 0 | 1 |
| | | 1 * | 0 | 0 | 0 | 0 | 1 |
| | | 1 * | 0 | 0 | 0 | 1 | 0 |
| | | 0 | 0 | 1 * | 0 | 1 | 0 |
| | | 0 | 0 | 1 * | 1 | 0 | 0 |
| | | 0 | 1 * | 0 | 1 | 0 | 0 |
| STAND-BY MODE | CCW ROTATION | 0 | 0 | 0 * | 0 | 1 | 0 |
| | | 0 | 0 | 0 * | 1 | 0 | 0 |
| | | 0 | 0 * | 0 | 1 | 0 | 0 |
| | | 0 | 0 * | 0 | 0 | 0 | 1 |
| | | 0 * | 0 | 0 | 0 | 0 | 1 |
| | | 0 * | 0 | 0 | 0 | 1 | 0 |
| | CW ROTATION | 0 | 0 * | 0 | 0 | 0 | 1 |
| | | 0 * | 0 | 0 | 0 | 0 | 1 |
| | | 0 * | 0 | 0 | 0 | 1 | 0 |
| | | 0 | 0 | 0 * | 0 | 1 | 0 |
| | | 0 | 0 | 0 * | 1 | 0 | 0 |
| | | 0 | 0 * | 0 | 1 | 0 | 0 |
| BRAKING MODE | | 0 | 0 | 0 | 1 | 1 | 1 |
| FREE MODE | | 0 | 0 | 0 | 0 | 0 | 0 |

1 : ON STATE (CLOSED STATE)   1 * : UNDER DUTY CONTROL BY PWM

0 : OFF STATE (OPEN STATE)    0 * : STATE IN WHICH PULSE-ON TIME IS 0 UNDER DUTY CONTROL BY PWM

VEHICLE STABILIZER SYSTEM

This application is based on Japanese Patent Application No. 2004-381554 filed on Dec. 28, 2004, the contents of which are incorporated herein by reference.

BACKGROUND OF THE INVENTION

1. Field of the Invention

The present invention relates in general to a stabilizer system installed on a vehicle for reducing or restraining rolling of a body of the vehicle, and more particularly to such a stabilizer system in which elastic force to be exerted by a stabilizer bar is changeable by an actuator having an electric motor.

2. Discussion of Related Art

In recent years, there has been developed a so-called "active stabilizer", in detail, a stabilizer system in which elastic force to be exerted by a stabilizer bar is changed for effectively controlling or restraining rolling of a body of a vehicle. For instance, JP-A-2002-518245 and JP-A-2000-71738 disclose such a stabilizer system. The disclosed stabilizer systems include an electric motor whose operation is controlled for thereby effectively restraining the rolling of the vehicle body. In the disclosed stabilizer systems, the control of the operation of the motor is executed based on a rolling angle, a rolling moment, and so on, whereas the control of the operation of the motor is not executed in a range wherein the rolling is uncontrollable by the motor or the motor is overloaded.

SUMMARY OF THE INVENTION

In actual running of the vehicle, a determination as to whether or not the operation of the motor should be controlled varies depending upon a running state of the vehicle, condition of a road surface on which the vehicle travels, etc. Accordingly, the disclosed stabilizer systems which are arranged not to execute the control of the operation of the motor in the uncontrollable range or in the overloaded range are not sufficiently practical. This invention has been developed in the light of the situations described above. It is therefore an object of the invention to improve utility of a stabilizer system having an electric motor and executing a control for restraining rolling of a vehicle body.

To achieve the object indicated above, a stabilizer system of the present invention that includes an actuator having an electric motor and changing elastic force to be exerted by a stabilizer bar is arranged such that an operation mode relating to the electric motor, in detail, the operation mode which depends on a motor-phase-connecting formation and a power-supply status of the electric motor is changeable on the basis of at least one of a running state of a vehicle and surface condition of a road on which the vehicle travels.

In the stabilizer system according to the present invention, the operation mode of the motor is arranged to be changeable on the basis of the at least one of the vehicle running state and the road surface condition. Therefore, the present stabilizer system can work so as to be adapted to actual running of the vehicle, thereby assuring high utility.

FORMS OF INVENTION

There will be described in detail various forms of an invention, which are considered claimable. Each of the forms of the invention is numbered like the appended claims and depends from the other form or forms, where appropriate, for easier understanding of the invention. It is to be understood that the invention is not limited to the technical features or any combinations thereof which will be described, and shall be construed in the light of the following descriptions of the various forms and preferred embodiments of the invention. It is to be further understood that a plurality of elements or features included in any one of the following forms of the invention are not necessarily provided all together, and that any form in which one or more elements or one or more features is/are added to any one of the following forms and any form in which one or more elements or one or more features is/are deleted from any one of the following forms may be considered claimable.

(1) A stabilizer system for a vehicle comprising:

a stabilizer bar connected to left and right wheels at respective opposite ends thereof;

an actuator which has an electric motor and which changes elastic force to be exhibited by the stabilizer bar, as a result of control of an operation of the electric motor; and a control device which controls the operation of the electric motor, wherein the control device includes an operation-mode changing portion which changes an operation mode of the electric motor that depends on a motor-phase-connecting formation and a power-supply status of the electric motor, on the basis of at least one of a vehicle running state and road surface condition.

The stabilizer system constructed according to the above-indicated form (1) is a so-called "active stabilizer system" in which elastic force to be exerted by a stabilizer bar is actively adjusted, thereby enabling active controlling of rolling of the vehicle body. In the stabilizer system according to the above form (1), the operation mode of the electric motor of the actuator is arranged to be changeable on the basis of at least one the vehicle running state and the road surface condition. Accordingly, the actuator can be controlled so as to be adapted to actual running of the vehicle, realizing the stabilizer system with high utility.

"Control of an operation of the electric motor" in the above form (1) means, for instance, that electric power to be supplied to the electric motor is controlled, namely, an operation amount, an operation force, etc., of the electric motor are controlled. (Where the electric motor is a rotary motor, a rotary amount, a torque, etc, are controlled.) As described above, "operation mode" of the electric motor depends on the motor-phase-connecting formation and the power-supply status of the electric motor. Here, "motor-phase-connecting formation" means a formation in relation to changing of phases of the motor in supplying electric power from a power source to the motor, connection between input lines of the respective phases of the electric motor and the power source, interrelation among the input lines of the respective phases, etc. The motor-phase-connecting formation will be explained in greater detail. "Power-supply status" means, for instance, a status as to whether or not electric power is under supply to the electric motor, how much power is supplied, and when or what timing electric power is supplied. As illustrated below, various modes can be set as the operation mode depending upon the motor-phase-connecting formation and the power-supply status, and the individual modes can have respective peculiar or inherent characteristics. Accordingly, by changing the operation mode of the electric mood while taking advantage of the inherent characteristics of the respective modes, the characteristics of the stabilizer can be variously changed. In this respect, the stabilizer system according to the form (1) assures high utility.

In the above-indicated form (1), the operation mode is changed based on at least one of the vehicle running state and the road surface condition. Here, "vehicle running state" is a concept including not only an actual running state of the vehicle, but also a posture of the vehicle, a posture of a body of the vehicle, a state in which the vehicle is operated, and so on. More specifically described, the vehicle running state includes various parameters which indicate various states such as: a running speed of the vehicle (which is a concept that also includes a wheel rotation speed and which may be hereinafter referred to as "vehicle speed"); posture-related amount such as a pitch angle or a rolling angle; a turning-state amount (which is a concept that includes a steering amount, a lateral force or a cornering force acting on the vehicle and the wheels, lateral acceleration generated in the vehicle, a yaw rate, a slipping angle, and the like); a braking state of the vehicle; an accelerating state of the vehicle; a magnitude of damping force generated by a suspension device. The vehicle running state, in detail, the above-indicated various parameters can be detected using appropriate known sensors. In this form (1), the operation mode can be changed based on detected values and detected results obtained by the sensors. Further, "road surface condition" means, for instance, a degree of roughness, bumpiness, ups and downs, waviness, inclination, or a surface friction coefficient μ, of the road on which the vehicle travels. Values of various parameters that indicate those described above can be a road-surface-condition amount indicative of the road surface condition. The road surface condition can be obtained as follows, for instance: There are detected using known sensors vertical acceleration of the vehicle body, a distance between upper and lower members which are respectively located above and below a suspension spring for each wheel, acceleration in a vertical movement of the upper member for each wheel, and so on. Based on the values detected by the sensors, the road surface condition can be obtained. In this form (1), the operation mode of the electric motor can be changed on the basis of the thus obtained road surface condition.

In the above-indicated form (1), it is to be understood that "stabilizer apparatus" is constituted by including the stabilizer bar and the actuator. The structure of the stabilizer bar is not particularly limited in this form (1). For instance, the stabilizer bar may be configured as follows: The actuator is disposed between one end of the stabilizer bar and a wheelhold member to which the one end of the stabilizer bar is connected. A distance between the above-indicated one end of the stabilizer bar and the wheel-hold member is suitably adjusted by the actuator, whereby the elastic force to be exerted by the stabilizer bar is arranged to be changeable. Alternatively, the stabilizer bar may be configured as follows: The stabilizer bar is divided into two, namely, a pair of stabilizer bar members between which the actuator is disposed. The pair of stabilizer bar members are rotated relative to each other by the actuator, whereby the elastic force to be exerted by the stabilizer bar is arranged to be changeable. In this form (1), the structure of "actuator" is not particularly limited. The actuator may include, in addition to the electric motor, a decelerator, a mechanical brake, etc. As "electric motor", any type may be employed, as long as its operation mode is arranged to be changeable. For instance, there may be employed a DC brushless motor which will be explained, an induction motor, a synchronous motor, a stepping motor or a reluctance motor. From the viewpoint of a motion, either a rotary motor or a linear motor may be employed.

(2) The stabilizer system according to the above form (1), wherein the operation-mode changing portion changes the operation mode of the electric motor between (a) a control mode wherein the motor-phase-connecting formation is a formation in which the operation of the electric motor is controllable and wherein electric power is supplied to the electric motor and (b) a non-control mode wherein the control of the operation of the electric motor is not executed by the control device.

"Control mode" in the above-indicated form (2) is an operation mode in which the amount of electric power supplied to the electric motor is controlled while changing phases of the electric motor in supplying electric power to the motor, thereby controlling the operation of the motor. That is, the control mode is an operation mode for executing a so-called "ordinary control" of the motor. The control mode is to be understood as an operation mode that intends to actively change the elastic force to be exerted by the stabilizer bar by controlling the actuator. On the contrary, unlike the control mode described above, "non-control mode" is an operation mode in which the electric motor is not controlled in a manner similar to that in the control mode. The non-control mode is to be understood as an operation mode that does not intend to actively control the actuator. For instance, the non-control mode may be an operation mode in which electric-power supply from a power source to the electric motor is not conducted. By changing the operation mode to such an operation mode, power consumption of the stabilizer system can be reduced.

(3) The stabilizer system according to the above form (2), wherein the operation-mode changing portion changes the operation mode of the electric motor between the control mode and one of operation modes each as the non-control mode selected from (b-1) a stand-by mode wherein the motor-phase-connecting formation is a formation in which the operation of the electric motor is controllable and wherein electric power is not supplied to the electric motor, (b-2) a braking mode wherein the motor-phase-connecting formation is a formation in which phases of the electric motor are connected to each other, and (b-3) a free mode wherein the motor-phase-connecting formation is a formation in which electric power is inhibited from being supplied to phases of the electric motor.

In the above-indicated form (3), the non-control mode described above is limited to one of operation modes selected from three concrete operation modes. The three modes (b-1)-(b-3) do not intend to actively control the actuator. Further, in the three modes, electric-power supply from a control power source to the electric motor is not conducted. The three modes have respective peculiar or inherent characteristics described below. By appropriately selecting one of the three operation modes, the actuator can be optimally controlled taking advantage of the characteristic of the selected operation mode. In this form (3), it is not necessary that the control device be arranged to execute all of the three operation modes. The control device may be arranged to execute at least one of the three modes. Namely, this form (3) includes an arrangement in which only one of the three modes is executed and the operation mode of the motor is changed between that one mode and the control mode described above.

"Stand-by mode" in the above-indicated form (3) is considered as an operation mode wherein changing of the phases of the electric motor is executed whereas electric-power supply to the motor is not conducted. For instance, in the stand-by mode, as explained in detail below, where a power source device for supplying electric power to the motor is constituted by including an inverter, changing of switching elements of the inverter on one of a plus(+) side and a minus(−) side is carried out whereas duty control by switching elements on the other of the plus(+) side and the minus(−) side is not carried out. The stand-by mode assures excellent readiness and responsiveness in shifting to the control mode. Further, because the stand-by mode can permit regeneration of an electromotive force generated by the electric motor as explained below, it is possible to apply, to the actuator, braking effect owing to the regeneration and to achieve power saving of the stabilizer system.

"Braking mode" in the above-indicated form (3) is considered as an operation mode wherein the motor-phase-connecting formation is a formation in which the input lines of the electric motor are connected to each other. Where the phases of the motor are connected to each other without any resistance intervened, namely, where the phases are short-circuited, there can be obtained effect of so-called "short-circuit braking". The short-circuit braking is one kind of braking utilizing the electromotive force generated in the electric motor, and assures relatively large braking effect among braking utilizing the electromotive force. Accordingly, owing to the short-circuit braking, the stabilizer bar is nearly locked, thereby enabling the stabilizer bar to exhibit a function close to that of a non-active, conventional stabilizer bar. Where the phases are connected to each other with resistances intervened, medium-degree braking effect can be obtained. Though the medium-degree braking provides braking force smaller than that provided by the short-circuit braking, a part of the electromotive force is consumed by the resistances, thereby inhibiting generation of heat in the electric motor. As explained below in detail, where a power source device for supplying electric power to the motor is constituted by including an inverter, this braking mode is realized, for instance, by placing the switching elements of the respective phases on one of the plus(+) side and the minus(−) side, into ON state (into a closed state).

"Free mode" in the above-indicated form (3) is generally an operation mode wherein the input lines of the respective phases of the electric motor and a power source are disconnected from each other, in other words, an operation mode wherein each phase of the electric motor is placed in an open state. In this free mode, the electromotive force is not generated and substantially no braking effect is obtained. Accordingly, by employing this operation mode, the stabilizer bar exerts little elastic force and therefore it may be considered that the vehicle is not equipped with the stabilizer. In this respect, under this operation mode, independency is maintained on the right side and the left side of the vehicle in a situation wherein there acts an external force that moves the right-side and left-side wheels vertically in opposite directions, e.g., in a situation wherein the right-side wheel or left-side wheel runs onto a projection. Therefore, it is possible to improve ride comfort as felt by passengers of the vehicle during traveling on a bumpy road, a mogul road, or the like. As explained below in detail, where a power source device for supplying electric power to the motor is constituted by including an inverter, this free mode is realized, for instance, by placing all of the switching elements of the respective phases into OFF state (into an open state).

Where a plurality of operation modes among the above-indicated three operation modes (b-1)-(b-3) are executable and one operation mode is selected from the plurality of operation modes based on certain conditions, the operation mode of the motor can be also changed among the plurality of operation modes. Thus, above-indicated form (3) includes an arrangement in which the changing of the operation mode can be conducted among the non-control modes. In other words, the system according to a claimable invention can be practiced in a form in which the operation-mode changing portion changes the operation mode of the electric motor between: (a) the control mode wherein the motor-phase-connecting formation is a formation in which the operation of the electric motor is controllable and wherein electric power is supplied to the electric motor; and at least two of operation modes selected from (b-1) the stand-by mode wherein the motor-phase-connecting formation is a formation in which the operation of the electric motor is controllable and wherein electric power is not supplied to the electric motor, (b-2) the braking mode wherein the motor-phase-connecting formation is a formation in which phases of the electric motor are connected to each other, and (b-3) the free mode wherein the motor-phase-connecting formation is a formation in which electric power is inhibited from being supplied to the phases of the electric motor.

(4) The stabilizer system according to any one of the above forms (1)-(3), wherein the operation-mode changing portion includes a vehicle-speed-dependent determining portion which determines the operation mode of the electric motor to be changed, on the basis of a running speed of the vehicle as the vehicle running state.

In actual running of the vehicle, the degree of rolling of the vehicle body depends on the running speed of the vehicle. In detail, in turning of the vehicle, where the vehicle speed is large, namely, where the vehicle is running at a high speed, the rolling of the vehicle body is relatively large. On the contrary, where the vehicle speed is small, namely, where the vehicle is running at a low speed, the rolling of the vehicle body is relatively small. In other words, demand for the control of the stabilizer apparatus depends on the vehicle running state such as the vehicle speed. The above-indicated form (4) is arranged to determine the operation mode in the light of the above and permits the stabilizer apparatus to be controlled so as to be adapted to the actual running of the vehicle.

(5) The stabilizer system according to the above form (4), wherein the vehicle-speed-dependent determining portion determines the operation mode of the electric motor to be (b-3) a free mode wherein the motor-phase-connecting formation is a formation in which electric power is inhibited from being supplied to phases of the electric motor, where the running speed of the vehicle is smaller than a predetermined threshold speed.

The above-indicated form (5) is one form relating to determination of the operation mode of the motor based on the vehicle speed. As explained above, when the vehicle is running at a low speed, there is a little chance that the rolling amount is large. Therefore, the necessity to actively control the rolling is low. In view of this, the free mode is employed, in this form (5), as the operation mode of the motor when the vehicle is running at a low speed. The free mode assures good ride comfort as felt by the passengers of the vehicle as explained above, so that this form (5) realizes the stabilizer system which gives priority to the ride comfort of the vehicle during low-speed running. This form (5) may be regarded as one form that employs the non-control mode when the vehicle is running at a low speed. There may be realized a stabilizer system which employs, during the low-speed running, other two non-control modes except for the free mode, though this stabilizer system does not belong to this form (5).

(6) The stabilizer system according to any one of the above forms (1)-(5), wherein the operation-mode changing portion includes a steering-amount-dependent determining portion which determines the operation mode of the electric motor to be changed, on the basis of a steering amount of the vehicle as the vehicle running state.

In actual running of the vehicle, the degree of rolling of the vehicle body depends on the steering amount of the vehicle. In detail, in turning of the vehicle, where the steering amount is large, the rolling of the vehicle body is relatively large. On the contrary, where the steering amount is small, the rolling of the vehicle body is relatively small. In other words, demand for the control of the stabilizer apparatus depends on the vehicle running state such as the steering amount. The above-indicated form (6) is arranged to determine the operation mode in the light of the above and permits the stabilizer apparatus to be controlled so as to be adaptable to the actual running of the vehicle. "Steering amount" in this form (6) may be an operation amount of a steering-operating member such as a steering wheel (e.g., a steering angle), a steered amounts of wheels indicated by an amount of movement of a steering rod of a wheel-steering device, or the like The above-indicated form (6) can be practiced as a form in which the steering-amount-dependent determining portion determines the operation mode of the electric motor to be the non-control mode described above where the steering amount is not greater than a predetermined threshold steering amount. As explained above, where the steering amount is small, there is a little chance that the rolling amount is large. Therefore, the necessity to actively control the rolling is low. This form (6) takes into account this.

(7) The stabilizer system according to any one of the above forms (1)-(3), wherein the operation-mode changing portion includes: a vehicle-speed-dependent determining portion which determines the operation mode of the electric motor to be changed, on the basis of a running speed of the vehicle as the vehicle running state; and a steering-amount-dependent determining portion which determines the operation mode of the electric motor to be changed, on the basis of a steering amount of the vehicle as the vehicle running state.

In the above-indicated form (7), the operation-mode changing portion includes both of the vehicle-speed-dependent determining portion and the steering-amount-dependent determining portion described above. This form (7) permits the stabilizer apparatus to be controlled so as to be adapted to the running state of the vehicle owing to the two determining portions. This form (7) may be regarded as a form in which the vehicle-speed-dependent determining portion and the steering-amount-dependent determining portion cooperate with each other to determine the operation mode of the electric motor. More specifically described, this form (7) includes, for instance, an arrangement in which the vehicle-speed-dependent determining portion initially determines a plurality of operation modes and the steering-amount-dependent determining portion then determines one operation mode among the determined plurality of operation modes, and an arrangement in which the steering-amount-dependent determining portion initially determines a plurality of operation modes and the vehicle-speed-dependent determining portion then determines one operation mode among the determined plurality of operation modes.

(8) The stabilizer system according to the above form (7), wherein the vehicle-speed-dependent determining portion determines the operation mode of the electric motor to be changed, by comparison between the running speed of the vehicle and a predetermined threshold speed, and the steering-amount-dependent determining portion determines the operation mode of the electric motor to be changed, by comparison between the steering amount of the vehicle and a predetermined threshold steering amount.

In the above-indicated form (8), the two determining portions are arranged to determine the operation mode on the basis of the thresholds respectively set for the two determining portions. According to this form (8), the operation mode of the electric motor can be determined in a simple manner. One of, or both of, the threshold speed and the threshold steering amount may be a fixed value or respective fixed values, or may be varied continuously or in steps (ultimately between two values), based on certain conditions, parameters, or the like.

(9) The stabilizer system according to the above form (7) or (8), wherein the operation-mode changing portion is arranged such that the vehicle-speed-dependent determining portion and the steering-amount-dependent determining portion determine the operation mode of the electric motor to be changed to be (b-3) a free mode wherein the motor-phase-connecting formation is a formation in which electric power is inhibited from being supplied to phases of the electric motor, where the steering amount of the vehicle is smaller than a predetermined threshold steering amount and the running speed of the vehicle is smaller than a predetermined threshold speed and such that the vehicle-speed-dependent determining portion and the steering-amount-dependent determining portion determine the operation mode of the electric motor to be changed to be (b-1) a stand-by mode wherein the motor-phase-connecting formation is a formation in which the operation of the electric motor is controllable and wherein electric power is not supplied to the electric motor, where the steering amount of the vehicle is smaller than the predetermined threshold steering amount and the running speed of the vehicle is not smaller than the predetermined threshold speed.

The above-indicated form (9) is one concrete form of determining the operation mode of the electric motor by the two determining portions. For instance, this form (9) may be arranged such that the steering-amount-dependent determining portion selects the free mode and the stand-by mode explained above where the steering amount is small and such that the vehicle-speed-dependent determining portion selects one of those two operation modes selected by the steering-amount-dependent determining portion, thereby determining the operation mode of the electric motor. According to this form (9), because the rolling of the vehicle body is small and therefore the necessity to actively control the actuator is low where the vehicle speed and the steering amount are small, the ride comfort of the vehicle has priority taking advantage of the characteristics of the free mode. In a case where the vehicle speed is increased to a higher level, the operation mode is changed from the free mode to the stand-by mode in which the active rolling control is executable with good readiness taking advantage of the characteristics of the stand-by mode when the rolling becomes large due to a variation in the steering amount.

(10) The stabilizer system according to any one of the above forms (7)-(9), wherein the operation-mode changing portion is arranged such that the vehicle-speed-dependent determining portion and the steering-amount-dependent determining portion determine the operation mode of the electric motor to be changed to be (b-2) a braking mode wherein the motor-phase-connecting formation is a formation in which phases of the electric motor are connected to each other, where the steering amount of the vehicle is not smaller than a predetermined threshold steering amount and the running speed of the vehicle is smaller than a predetermined threshold speed and such that the vehicle-speed-dependent determining portion and the steering-amount-dependent determining portion determine the operation mode of the electric motor to be changed to be (a) a control mode wherein the motor-phase-connecting formation is a formation in which the operation of the electric motor is controllable and wherein electric power is supplied to the electric motor, where the steering amount of the vehicle is not smaller than the predetermined threshold steering amount and the running speed of the vehicle is not smaller than the predetermined threshold speed.

The above-indicated form (10) is one concrete form of determining the operation mode of the electric motor by the two determining portions. For instance, this form (10) may be arranged such that the steering-amount-dependent determining portion selects the control mode and the braking mode explained above where the steering amount is large and such that the vehicle-speed-dependent determining portion selects one of those two operation modes selected by the steering-amount-dependent determining portion, thereby determining the operation mode of the electric motor. According to this form (10), because the rolling of the vehicle body is large where the vehicle speed and the steering amount are large, the operation mode of the electric motor is determined to be the control mode wherein the actuator is actively controllable. Though the necessity to actively control the actuator is comparatively small where the vehicle speed is relatively small, the braking mode is determined as the operation mode making good use of the characteristic of the braking mode that the elastic force is exerted by the stabilizer bar to some extent.

(11) The stabilizer system according to any one of the above forms (8)-(10), wherein the operation-mode changing portion includes a threshold changing portion which changes at least one of the threshold steering amount and the threshold speed which is set for one of the steering amount of the vehicle and the running speed of the vehicle, on the basis of the other of the steering amount of the vehicle and the running speed of the vehicle.

The above-indicated form (11) includes, for instance, an arrangement in which the threshold steering amount is changed depending upon the vehicle speed in determination of the operation mode by the steering-amount-dependent determining portion, an arrangement in which the threshold speed is changed depending upon the steering amount in determination of the operating mode by the vehicle-speed-dependent determining portion, and an arrangement in which those two arrangements are combined. Where the operation mode is changed as a result of a change in the vehicle speed or the steering amount across the threshold, the vehicle operator may feel a control gap. Briefly speaking, there is a possibility that the vehicle operator feels discomfort in the behavior of the vehicle at transition of the operation modes from one to another, due to difference in characteristics between the operation modes. According to this mode (11) wherein the threshold is changeable, it is possible to change the operation mode while allowing the vehicle operator to feel the control gap as minimum as possible.

(12) The stabilizer system according to any one of the above forms (1)-(11), wherein the operation-mode changing portion includes a road-surface-condition-dependent determining portion which determines the operation mode of the electric motor to be changed, on the basis of the road surface condition.

The surface condition of the road on which the vehicle travels is a factor that influences the ride comfort of the vehicle. In the light of this, the stabilizer apparatus is preferably controlled depending upon the road surface condition. For instance, it is preferable that the characteristic of the stabilizer apparatus during running on a flat road and the characteristic of the stabilizer apparatus during running on a bad-condition road such as a bumpy road, a mogul road, or the like be made different from each other. According to this form (12), the operation mode of the electric motor can be changed depending upon the road surface condition, whereby the stabilizer apparatus can be controlled so as to be suited to the actual running state of the vehicle. This form (12) may be modified such that the operation-mode changing portion has at least one of the vehicle-speed-dependent determining portion and steering-amount-dependent determining portion explained above, in addition to the road-surface-condition-dependent determining portion. This modified form may be arranged to give precedence to the determination by the road-surface-condition-dependent determining portion, irrespective of the determination by at least one of the vehicle-speed-dependent determining portion and steering-amount-dependent determining portion. Further, the modified form may be arranged such that the road-surface-condition-dependent determining portion determines the operation mode while taking into account or being influenced by the determination made by at least one of the vehicle-speed-dependent determining portion and steering-amount-dependent determining portion, briefly speaking, in cooperation with at least one of the vehicle-speed-dependent determining portion and steering-amount-dependent determining portion.

(13) The stabilizer system according to the above form (12), wherein the road-surface-condition-dependent determining portion determines the operation mode of the electric motor to be (b-3) a free mode wherein the motor-phase-connecting formation is a formation in which electric power is inhibited from being supplied to phases of the electric motor, where the road surface condition is bad.

Where the vehicle is running on the bad-condition road, either a right-side wheel or a left-side wheel tends to run onto a projection. In this state, the elastic force to be exerted by the stabilizer bar may adversely influence the ride comfort of the vehicle. According to this form (13), the free mode is selected when the vehicle is running on the bad-condition road. Therefore, this form assures good ride comfort of the vehicle during running on the bad-condition road by taking advantage of the characteristic of the free mode that the substantially no elastic force is exerted by the stabilizer bar for thereby assuring independency in the vertical movement of the right-side and left-side wheels.

(14) The stabilizer system according to any one of the above forms (1)-(13), wherein the electric motor is a DC brushless motor.

Because the DC brushless motor has good controllability, it can be suitably used as a drive source for the actuator of the stabilizer apparatus. Further, owing to use of the DC brushless motor, the characteristics of the above-indicated three non-control modes can be appropriately realized depending upon the motor-phase-connecting formation and the power-supply state.

(15) The stabilizer system according to any one of the above forms (1)-(14), further comprising a power source device constituted by including an inverter, for supplying electric power to the electric motor, wherein the operation mode of the electric motor is changed by changing switching elements of the inverter.

Because the power source device constituted by including the inverter permits easy and accurate control of the operation of the electric motor, it is suitably used as the control power source for the stabilizer apparatus. Further, owing to the inverter, the above-indicated three non-control modes can be easily established by changing combinations of the ON (closed) and OFF (open) states of the switching elements such as FET provided for each phase.

BRIEF DESCRIPTION OF THE DRAWINGS

The above and other objects, features, advantages and technical and industrial significance of a claimable invention will be better understood by reading a following detailed description of a preferred embodiment of the invention, when considered in connection with the accompanying drawings, in which:

FIG. 6 is a table showing patterns of a motor-phase-connecting formation established by the inverter of FIG. 5 in respective operation modes of the electric motor;

DETAILED DESCRIPTION OF THE PREFERRED EMBODIMENT

Figure 1:
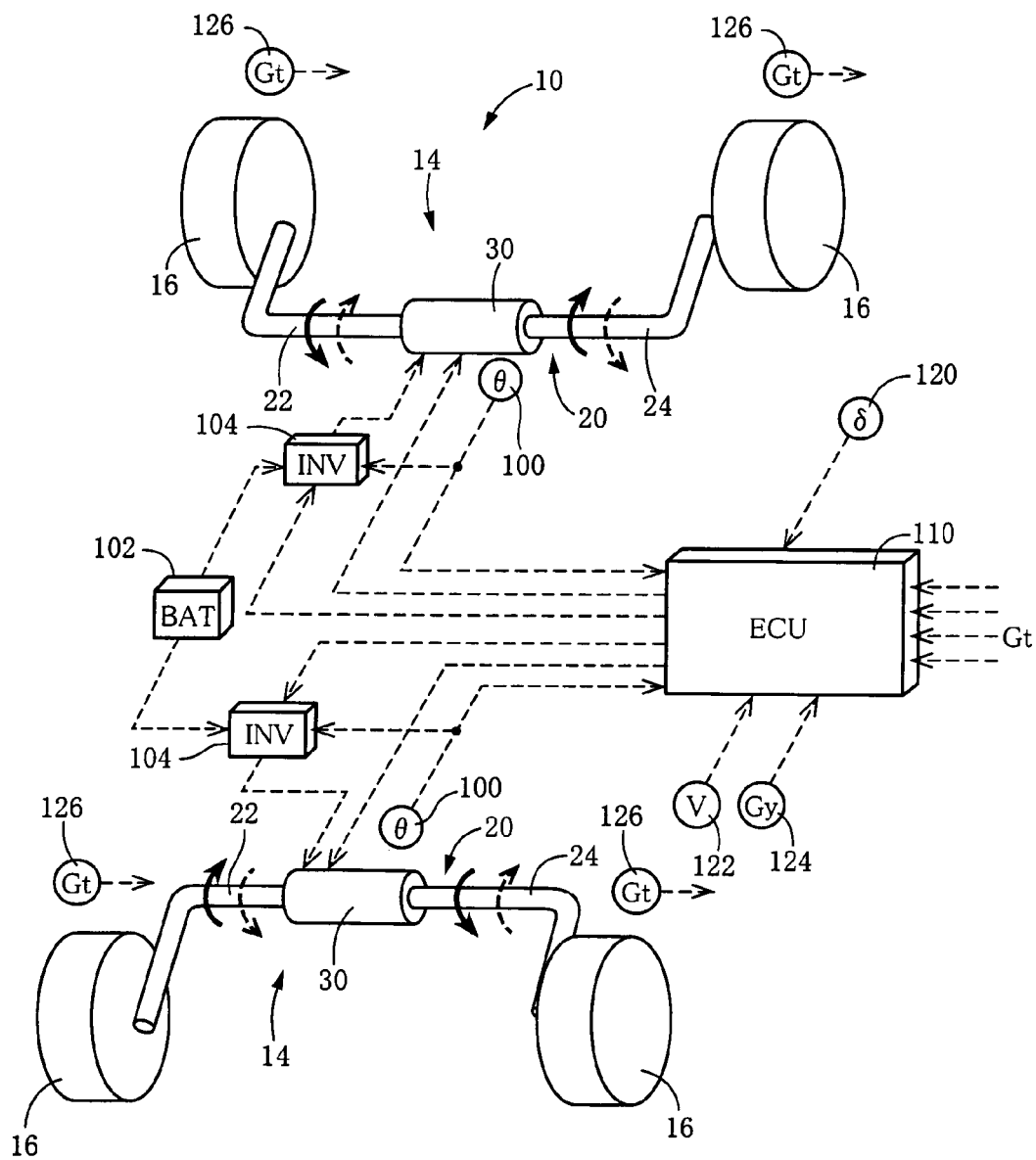
FIG. 1 is a schematic view showing an overall structure of a stabilizer system according to one embodiment of a claimable invention.

There will be described in detail one embodiment of the claimable invention, referring to the drawings. It is to be understood, however, that the invention is not limited to the following embodiment, but the invention may be embodied with various changes and modifications, such as those described in the SUMMARY OF THE INVENTION, which may occur to those skilled in the art.

1. Overall Structure of Stabilizer System

FIG. 1 conceptually shows a stabilizer system 10 for a vehicle according to one embodiment of the invention. The stabilizer system 10 includes two stabilizer apparatuses 14 which are disposed respectively on a front-wheel side and a rear-wheel side of the vehicle. Each stabilizer apparatus 14 includes a stabilizer bar 20 connected at opposite ends thereof to respective wheel holding members (FIG. 2) which respectively hold front and rear wheels 16. The stabilizer bar 20 is divided at a middle portion thereof into two parts, i.e., a right stabilizer bar member 22 and a left stabilizer bar member 24. The pair of stabilizer bar members 22, 24 are connected rotatably relative to each other with an actuator 30 interposed therebetween. Roughly speaking, the stabilizer apparatus 14 is arranged such that the actuator 30 rotates the right and left stabilizer bar members 22, 24 relative to each other (as shown in arrows indicated by solid line and arrows indicated by broken line in FIG. 1), thereby changing elastic force to be exerted by the stabilizer bar 20 as a whole, for controlling the rolling of the vehicle body.

Figure 2:
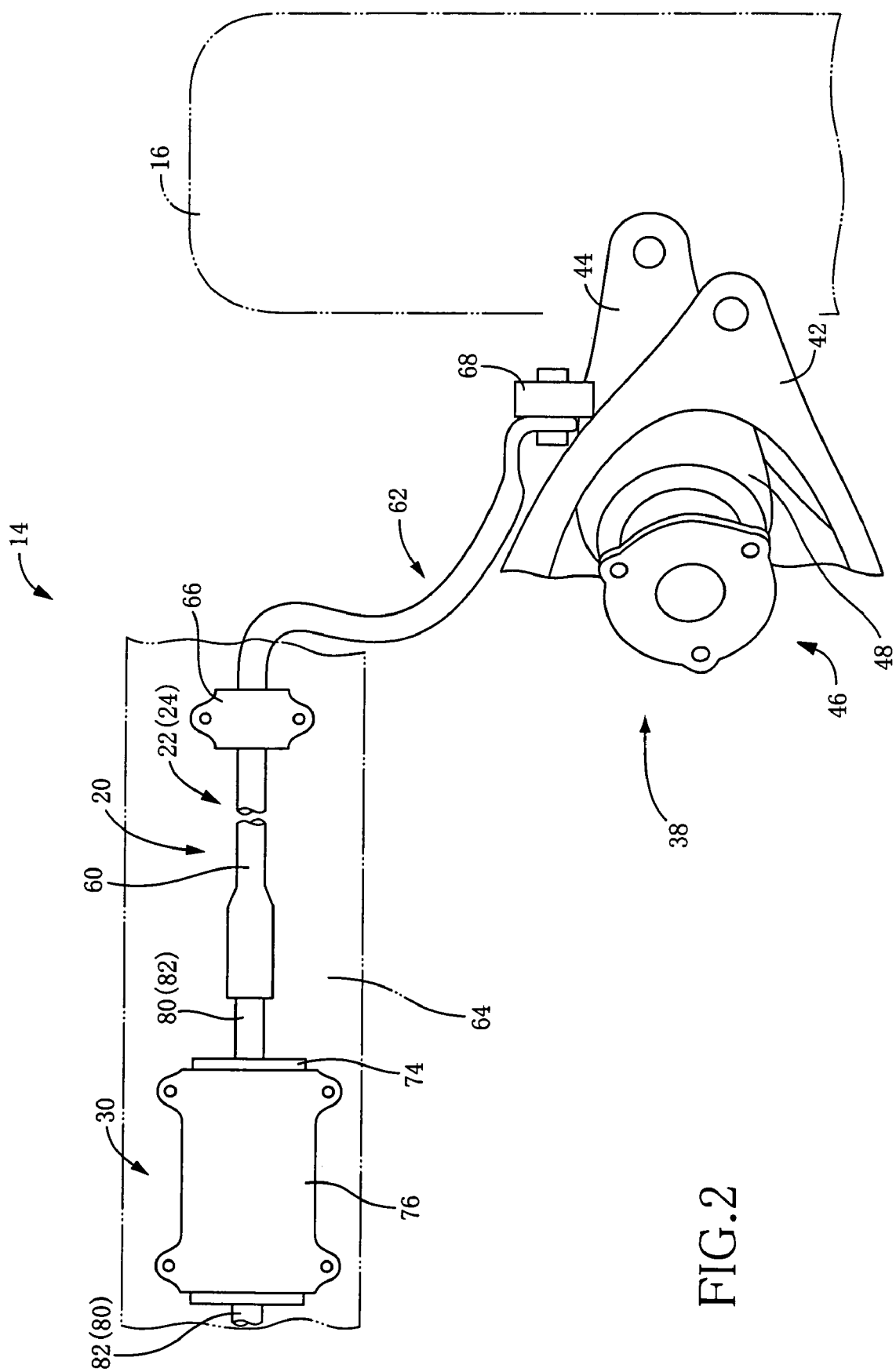
FIG. 2 is a schematic view showing a stabilizer apparatus of the stabilizer system of FIG. 1.

FIG. 2 schematically shows a portion of the stabilizer apparatus 14 ranging from its middle part in a widthwise direction of the vehicle to a wheel 16 on one of the right-side and the left-side of the vehicle. The vehicle on which the present stabilizer system 10 is installed includes four independent suspension apparatuses 38 provided respectively for the four wheels 16. Each suspension apparatus 38 is a double wishbone type well known in the art and includes an upper arm 42 and a lower arm 44 which cooperate with each other to function as the wheel holding member. Each of the upper and lower arms 42, 44 is rotatably connected at one end thereof to a vehicle body and connected at the other end thereof to the corresponding wheel 16. Each of the upper and lower arms 42, 44 is pivotably moved or swung about the above-indicated one end (vehicle-body-side end) while the other end (wheel-side end) is moved generally in the vertical direction relative to the vehicle body, as the corresponding wheel 16 and the vehicle body approach toward and remove away from each other (namely, as the wheel 16 and the vehicle body move relative to each other in the vertical direction). The suspension apparatus 38 further includes a shock absorber 46 and a suspension spring 48 (which is an air spring in the present embodiment). Each of the shock absorber 46 and spring 48 is connected to a member on the vehicle-body side and a member on the wheel side. The thus constructed suspension apparatus 38 elastically support the corresponding wheel 16 and the vehicle body and has a function of generating damping force with respect to a vibration which is accompanied by the relative displacement between the wheel 16 and the vehicle body toward and away from each other.

The stabilizer apparatus 14 includes the pair of stabilizer bar members, i.e., the right stabilizer bar member 22 and the left stabilizer bar member 24. (In FIG. 2, one of the right and left bar members 22, 24 is shown.) Each of the right and left bar members 22, 24 has a torsion bar portion 60 extending substantially in the widthwise direction of the vehicle, and arm portion 62 formed integrally with the torsion bar portion 60 and intersecting the same 60 so as to extend generally in a frontward or a rearward direction of the vehicle. The torsion bar portion 60 of each bar member 22, 24 is rotatably supported, at a position thereof near to the arm portion 62, by a support member 66 which is fixedly disposed at a stabilizer-apparatus mounting portion 64 that is a part of the vehicle body. Thus, the torsion bar portions 60 of the respective right and left bar members 22, 24 are disposed coaxially relative to each other. Between respective ends of the torsion bar portions 60 of the right and left bar members 22, 24, which ends are located near to a widthwise middle portion of the vehicle, the actuator 30 is disposed. As explained below in detail, the respective ends of the torsion bar portions 60 are connected to the actuator 30. In the meantime, one end of each arm portion 62 remote from the corresponding torsion bar portion 60 is connected to a stabilizer-bar connecting portion 68 of the corresponding lower arm 44 so as to be rotatable relative to the same 68.

Figure 3:
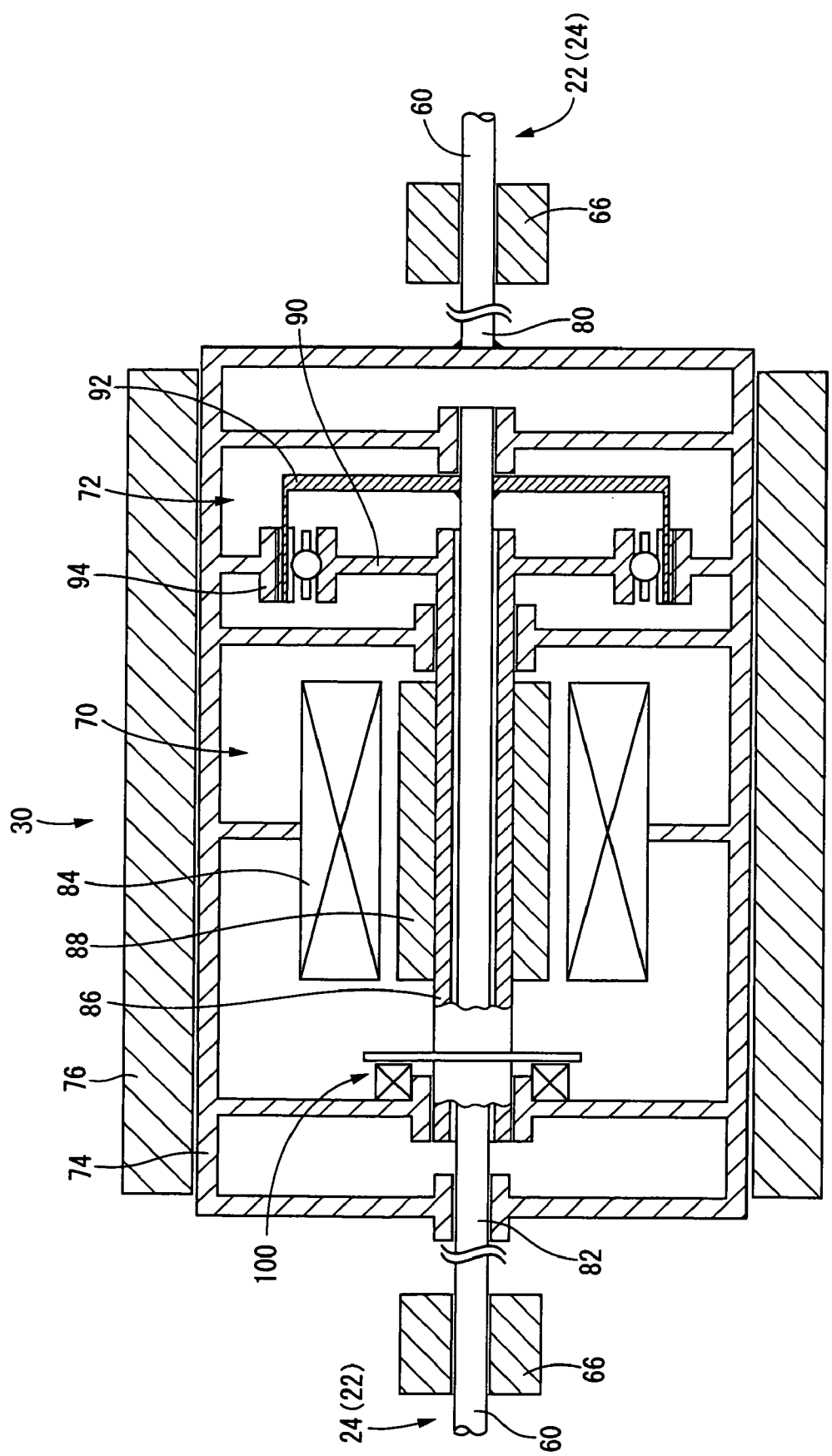
FIG. 3 is a schematic view in cross section showing an actuator of the stabilizer apparatus of FIG. 1.

As schematically shown in FIG. 3, the actuator 30 includes an electric motor 70 and a decelerator 72 connected to the electric motor 70 for decelerating rotation of the electric motor 70. The electric motor 70 and the decelerator 72 are disposed inside a housing 74 as an outer frame member of the actuator 30. The housing 74 is held, at the stabilizer-apparatus mounting portion 64, by a housing holding member 76 so as to be rotatable and immovable in the axial direction (i.e., substantially in the widthwise direction of the vehicle) relative to the hosing holding member 76. As shown in FIG. 2, two output shafts 80, 82 extend respectively from opposite ends of the housing 74. The output shafts 80, 82 are unrotatably connected by serration engagement, at their leading ends remote from the housing 74 respectively to ends of the respective right and left bar members 22, 24. Further, as shown in FIG. 3, one 80 of the two output shafts 80, 82 is fixedly connected to one of the opposite ends of the housing 74 while the other 82 of the two output shafts 80, 82 is disposed so as to extend into the housing 74 and is held by the housing 74 so as to be rotatable and axially immovable relative to the same 74. One end of the output shaft 82 located within the housing 74 is connected to the decelerator 72 as explained below in detail.

The electric motor 70 includes: a plurality of stator coils 84 fixedly disposed on one circumference along an inner circumferential surface of the cylindrical wall of the housing 74; a hollow motor shaft 86 rotatably held by the housing 74; and permanent magnets 88 fixedly disposed on one circumference along an outer circumferential surface of the motor shaft 86 so as to face the stator coils 84. The electric motor 70 is a motor in which each stator coil 84 functions as a stator and each permanent magnet 88 functions as a rotor, and is a three-phase DC brushless motor.

In the present embodiment, the decelerator 72 is constituted as a harmonic gear mechanism (called as "HARMONIC DRIVE" (trademark), a strain wave gear ring mechanism, etc.) including a wave generator 90, a flexible gear 92, and a ring gear 94. The wave generator 90 includes an oval cam and ball bearings fitted on a periphery of the cam, and is fixed to one end of the motor shaft 80. The flexible gear 92 is a cup-like member whose cylindrical wall portion is elastically deformable. A plurality of teeth are formed on an outer circumference of the open end portion of the cup-like flexible gear 92. The flexible gear 92 is connected to the output shaft 82 described above and is held by the same 82. In detail, the output shaft 82 penetrates the motor shaft 86 and has an end portion extending from or beyond the one end of the motor shaft 86. To this end portion of the output shaft 82, a bottom portion of the flexible gear 92 is fixed, whereby the flexible gear 92 and the output shaft 82 are connected to each other. The ring gear 94 is a generally ring-like member and is fixed to the housing 74. A plurality of teeth are formed on an inner circumference of the ring gear 94. The number of teeth formed on the inner circumference of the ring gear 94 is slightly larger (e.g., larger by two) than the number of teeth formed on the outer circumference of the flexible gear 92. The flexible gear 92 is fitted at its cylindrical wall portion on the wave generator 90, and is elastically deformed into an oval shape. The flexible gear 92 meshes the ring gear 94 at two portions thereof corresponding to opposite ends of the long axis of the oval and does not mesh the same 94 at the other portion thereof. With one rotation of the wave generator 90 (i.e., after rotation of the wave generator 90 by 360°), in other words, after one rotation of the motor shaft 86 of the electric motor 70, the flexible gear 92 and the ring gear 94 are rotated relative to each other by an amount corresponding to the difference in the number of teeth therebetween. Because the structure of the harmonic gear mechanism is known in the art, a detailed illustration of the decelerator 72 is dispensed with and its explanation is limited to brief one given above.

In the thus constructed stabilizer apparatus 14, where the electric motor 70 is rotated, namely, where the actuator 30 operates, the torsion bar portions 60 of the respective right and left stabilizer bar members 22, 24 are rotated relative to each other, so that the stabilizer bar 20 which is considered as one stabilizer bar constituted by the right and left stabilizer bar members 22, 24 is twisted. Force generated by the twisting of the right and left stabilizer bar members 22, 24 acts as force that causes the right and left wheels 16 and the vehicle body to approach toward and remove away from each other. In other words, the present stabilizer apparatus 14 is arranged such that the actuator 30 operates to change the elastic force, namely, the rigidity, of the stabilizer bar 20.

The actuator 30 is provided, in the housing 74, with a motor rotational angle sensor 100 for detecting a rotational angle of the motor shaft 86, i.e., a rotational angle of the electric motor 70. The motor rotational angle sensor 100 of the present actuator 30 is constituted principally by an encoder. A value detected by the sensor 100 is utilized in changing phases of the electric motor 70 and in control of the actuator 30, i.e., in roll-restraining control by the stabilizer apparatus 14, as an index indicating a relative rotational angle (a relative rotational position) of the right and left stabilizer bar members 22, 24.

To the electric motor 70 of the actuator 30, electric power is supplied from a power source device. In the present stabilizer system 10, there are provided a battery 102 and two inverters 104 connected to the battery 102, as shown in FIG. 1. Each inverter 104 functions as a drive circuit. Electric power is supplied to the electric motors 70 of the respective two stabilizer apparatuses 14 from the respective inverters 104. Namely, the battery 102 and each inverter 104 cooperate to constitute the power source device for the corresponding electric motor 70.

As shown in FIG. 1, the present stabilizer system 10 includes a stabilizer electronic control unit (stabilizer ECU) 110 (hereinafter may be simply referred to as "the ECU 110") as a control device for controlling operation of the stabilizer apparatus 14, in detail, operation of the actuator 30. The ECU 110 is constituted principally by a computer including a CPU, a ROM, a RAM, etc. To the ECU 110, there are connected, in addition to the aforementioned motor rotational angle sensor 100, an operation-angle sensor 120 for detecting an operation angle of a steering wheel which is an operation amount of a steering operating member as a steering amount, a vehicle-speed sensor 122 for detecting a running speed of the vehicle (hereinafter may be simply referred to as "vehicle speed"), a lateral-acceleration sensor 124 for detecting actual lateral acceleration which is lateral acceleration actually generated in the vehicle, and a vertical-acceleration sensor 126 which is disposed on a mount portion of each wheel for detecting acceleration for a vertical movement of that portion of the vehicle body. In FIG. 1, these sensors 100, 120, 122, 124, 126 are shown as θ, δ, v, Gy and Gt, respectively. The ECU 110 is connected also to each of the inverters 104, whereby the ECU 110 controls the operation of each actuator 30 by controlling each inverter 104. In the ROM of the computer of the ECU 110, there are stored various programs (that will be explained) such as a roll-restraining control program, operation-mode-changing programs, various data relating to the control of the stabilizer apparatus 14, and so on.

2. Functional Structure of Control Device

Figure 4:
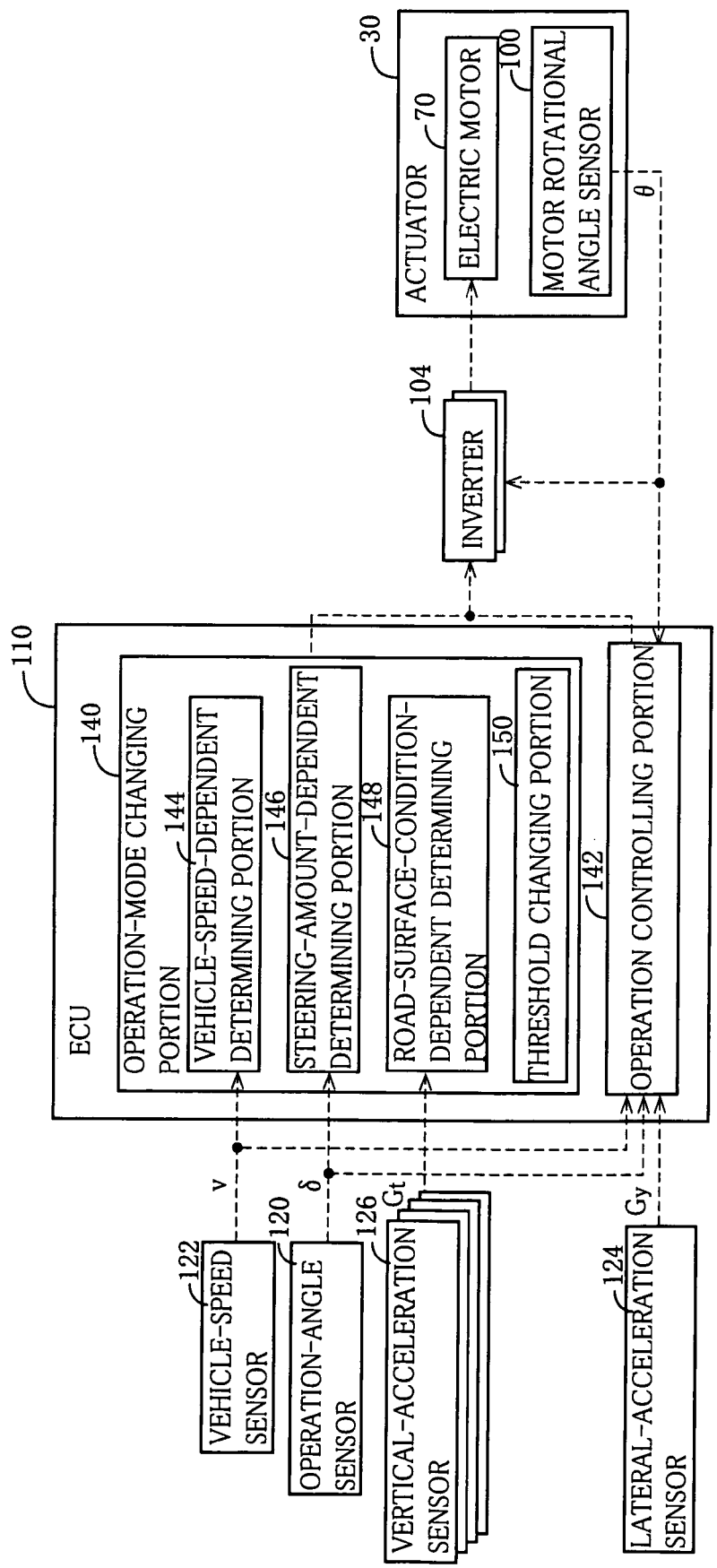
FIG. 4 is a block diagram conceptually showing functions of a stabilizer electronic control unit (ECU) of the stabilizer system of FIG. 1.

FIG. 4 conceptually expresses functions of the ECU 110 as the control device for controlling the stabilizer apparatus 14. The ECU 110 is constituted by including an operation-mode changing portion 140 which changes an operation mode of the electric motor 70 of the actuator 30 (that will be explained in greater detail) and an operation controlling portion 142 which controls the electric motor 70 to be operated for active roll controlling. The operation-mode changing portion 140 is constituted by including three determining portions for determining the operation mode to be changed, i.e., a vehicle-speed-dependent determining portion, 144, a steering-amount-dependent determining portion 146 and a road-surface-condition-dependent determining portion 148. The vehicle-speed-dependent determining portion 144 is a functional portion that determines the operation mode to be changed based on the vehicle speed. The steering-amount-dependent determining portion 146 is a functional portion that determines the operation mode to be changed based on the steering amount. The road-surface-condition-dependent determining portion 148 is a functional portion that determines the operation mode to be changed based on surface condition of a road on which the vehicle runs. At least two of these three determining portions 144, 146, 148 cooperate with each other to determine the operation mode to be changed, or only one of these three determining portions 144, 146, 148 determines the operation mode to be changed. The operation-mode changing portion 140 further includes a threshold changing portion 150 as a functional portion for changing a threshold speed and a threshold steering amount which are thresholds respectively used by the vehicle-speed-dependent determining portion 144 and the steering-amount-dependent determining portion 146 in determination of the operation mode. The operation controlling portion 142 works in an operation mode for actively controlling the actuator 30 and is a functional portion that permits the electric motor 70 to be operated for roll-restraining control. Detailed functions of the above-indicated functional portions will be explained in description about processing according to the roll-restraining control program and operation-mode changing programs executed by the ECU 110.

3. Operation Mode of Electric Motor

Figure 5:
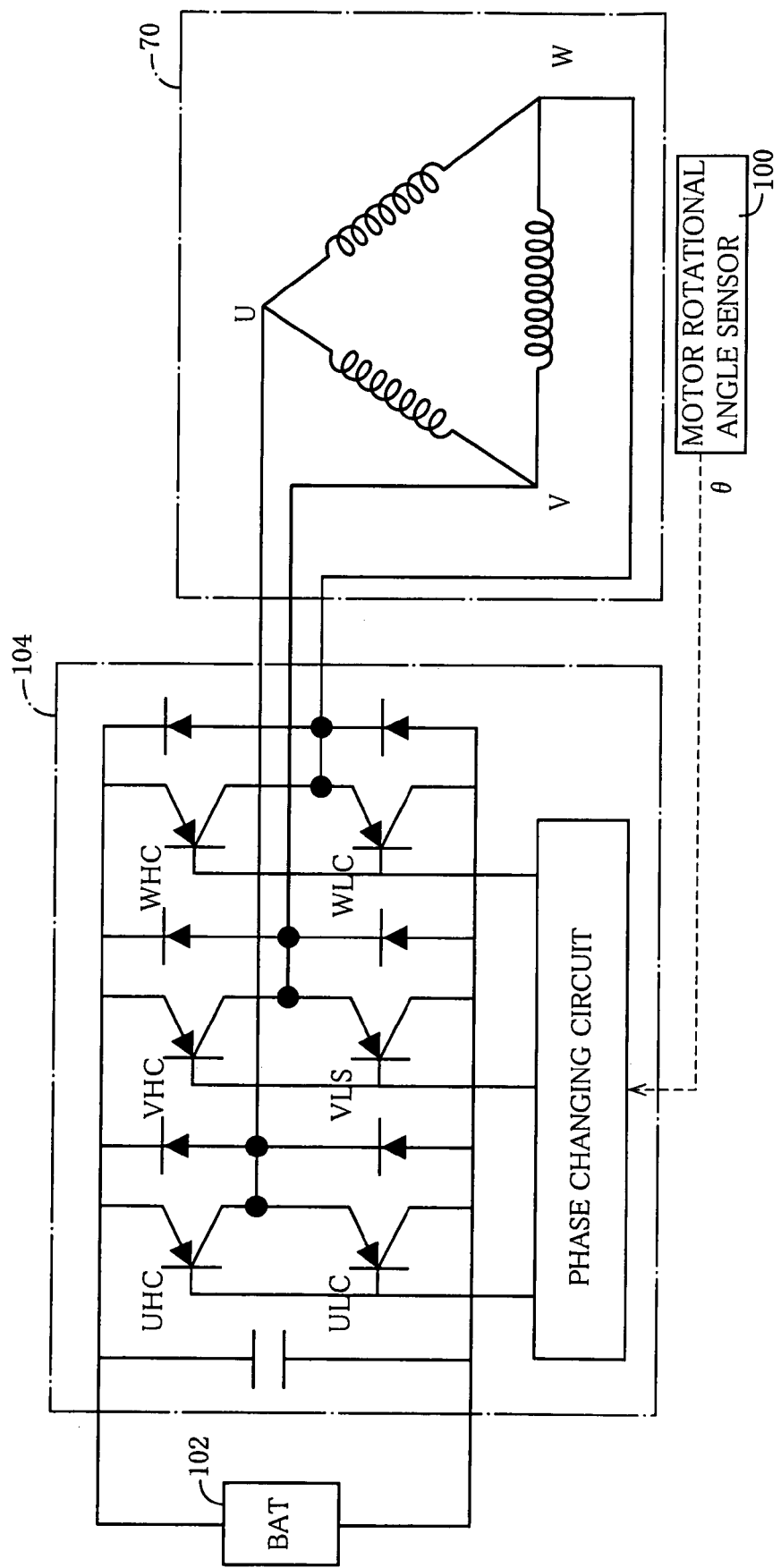
FIG. 5 is a circuit diagram in a state in which an inverter of the stabilizer system of FIG. 1 and an electric motor shown in FIG. 3 are connected to each other.

In the present stabilizer system 10, the electric motor of the actuator 30 of each stabilizer apparatus 14 is arranged to be operable in four operation modes and is operated in one of the four operation modes selected on the basis of predetermined conditions. The operation mode of the electric motor 70 depends on a motor-phase-connecting formation and a power-supply status of the electric motor 70. The four operation modes differ from one another in at least one of the motor-phase-connecting formation and the power-supply status. The operation mode is changed by changing ON/OFF states of switching elements of each inverter 104. As shown in FIG. 5, the electric motor 70 is a delta-connected, three-phase, DC brushless motor. The inverter 104 has two switching elements (FET), i.e., a high(plus) side-switching element and a low(minus) side-switching element, for each of the three phases (U, V, W) of the electric motor 70. Hereinafter, the six switching elements of the inverter 104 will be referred to as "UHC", "ULC", "VHC", "VLC", "WHC" and "WLC", respectively. The operation mode of the electric motor 70 is changed by changing the ON/OFF states of the respective six switching elements.

More specifically described, the four operation modes of the electric motor 70 consist of: a control mode in which the operation of the electric motor 70 is controllable; and three non-control modes in which the control of the operation of the electric motor is not executed. The three non-control modes consist of a stand-by mode, a braking mode and a free mode. Each operation mode will be explained referring to FIG. 6 showing changing patterns of the switching elements of each inverter 104.

(i) Control Mode

The control mode is an operation mode wherein the motor-phase-connecting formation is a formation in which the operation of the electric motor is controllable and wherein electric power is supplied to the electric motor 70. In the control mode, according to a system called as 120° rectangular-wave drive system, the ON/OFF states of the respective switching elements UHC, ULC, VHC, VLC, WHC, WLC are changed depending upon the motor rotational angle $\theta$ of the electric motor 70 according to changing patterns shown in FIG. 6 which are classified in two cases, i.e., a case in which the electric motor 70 is rotated clockwise (CW) and a case in which the electric motor 70 is rotated counterclockwise (CCW). Described more specifically, each pattern shown in FIG. 6 is set for every 60° of an electric angle. Since the electric motor 70 in the present embodiment is a three-phase and six-pole motor, the pattern is sequentially changed for every 20° of the motor rotational angle corresponding to 60° of the electric angle. Under this motor-phase-connecting formation, the switching elements ULC, VLC, WLC on the low side are subjected to duty control. Here, "duty control" is a control in which a ratio (duty ratio) of a pulse-on time to a pulse-off time by PWM (Pulse Width Modulation) is changed, thereby changing an amount of electric power to be supplied to the electric motor 70. Each symbol "1*" in FIG. 6 indicates a state in which those switching elements are under the duty control. It is noted that phase-changing timing and pulse-on/pulse-off timing are controlled by a phase switching circuit on the basis of signals generated by the motor rotation angle sensor 100 of the actuator 70.

As explained above, in the control mode, the rotating direction of the electric motor 70 and the amount of electric power supplied to the electric motor 70 can be controllable. Accordingly, the ordinary roll-restraining control, in detail, the active roll-restraining control can be executed in this control mode. Owing to the roll-restraining control (which will be explained in greater detail), the elastic force to be exerted by the stabilizer bar 20 can be actively changed by controlling the actuator 30.

(ii) Stand-By Mode

The stand-by mode is one kind of the non-control modes. The stand-by mode is an operation mode wherein the motor-phase-connecting formation is a formation in which the operation of the electric motor 70 is controllable and wherein electric power is not actually supplied to the electric motor 70. As shown in FIG. 6, as in the control mode described above, the ON/OFF states of the respective switching elements UHC, ULC, VHC, VLC, WHC, WLC are changed in accordance with the rotational angle $\theta$ of the electric motor 70. The stand-by mode differs from the control mode in that the switching elements ULC, VLC, WLC on the low side are not subjected to the Duty control. It may be said that the Duty control is performed such that the Duty ratio is zero. In other words, there exist no pulse-on times and no electric power is actually supplied to the electric motor 70. Each symbol "0*" in FIG. 6 shows this state.

In the stand-by mode, since no electric power is supplied to the electric motor 70, the operation of the electric motor 70 is not controllable, so that the actuator 30 does not actively operate. On the other hand, the changing of the phases is executed as described above, so that this stand-by mode deals with transition to the control mode with readiness. Therefore, the stand-by mode does not suffer from control delay and is excellent in responsiveness or readiness. Further, in this mode, the phases are changed in accordance with the motor rotational angle θ, so that regeneration utilizing diodes which are disposed together with the respective switching elements UHC, ULC, VHC, VLC, EHC, WLC can be expected. In other words, it is expected that the battery 102 is charged with electric power arising electromotive force that is generated in the electric motor 70 upon reverse input action of the stabilizer bar 20 (which means, for instance, that the stabilizer bar 20 is twisted as upper and lower members which are disposed respectively above and below the suspension spring for each wheel approach toward and remove away from each other and that the electric motor 70 is rotated as a result of twisting of the stabilizer bar 20). In this connection, braking force arising from the regeneration is generated in the electric motor 70, whereby the actuator 30 exerts resistance force with respect to the reverse input action to some extent.

(iii) Braking Mode

The braking mode is one kind of the non-control modes. In this braking mode, the motor-phase-connecting formation is a formation in which the phases of the electric motor 70 are connected to each other. Described more specifically, all of the switching elements UHC, VHC, WHC on the high side are placed in ON states (in closed states), as shown in FIG. 6. Owing to these switching elements UHC, VHC, WHC placed in the ON states and diodes disposed together with those switching elements, the phases of the electric motor 70 are kept as if they were short-circuited to each other. Accordingly, upon the reverse input action of the stabilizer bar 20, relatively large electromotive force is generated in the electric motor 70, so that relatively large braking force is given to the electric motor 70. Therefore, the actuator 30 is brought into a state in which it is nearly locked with respect to the reverse input action with a relatively high speed, whereby the pair of stabilizer bar members 22, 24 work as an integral unit. Namely, in this braking mode, the stabilizer apparatus 14 is kept in a state close to a stabilizer apparatus equipped with a conventional stabilizer bar without an actuator, so that the stabilizer bar 20 exerts the elastic force generally corresponding to that exerted by the conventional stabilizer bar.

(iv) Free Mode

The free mode is one kind of the non-control modes. In the free mode, the motor-phase-connecting formation is a formation in which electric power is inhibited from being supplied to the phases of the electric motor 70. More specifically explained, all of the switching elements UHC, ULC, VHC, VLC, WHC, WLC are placed in OFF states (open states), whereby the phases of the electric motor 70 are kept in a state close to that in which the phases of the electric motor 70 and the corresponding inverter 104 are disconnected from each other. Accordingly, even upon the reverse input action to the stabilizer bar 20, no electromotive force is generated in the electric motor 70. Hence, there is obtained in the motor 70 only braking force that results in a cogging torque, a sliding resistance, or the like, namely, the motor 70 exerts almost no resistance. In other words, the pair of stabilizer bar members 22, 24 are allowed to rotate relative to each other in a comparatively free state, so that the stabilizer bar 20 does not exert the elastic force and therefore the stabilizer apparatus 14 is placed in a state in which it does not work as a stabilizer apparatus. In this mode, too, there is formed a regenerative circuit utilizing diodes and the electric motor 70 per se works as a generator. However, since a regenerative current does not flow until the electric motor 70 generates a voltage in excess of the voltage of the power source, substantially no regenerative current flows and there is obtained substantially no braking effect by regeneration.

4. Roll-Restraining Control

Figure 7:
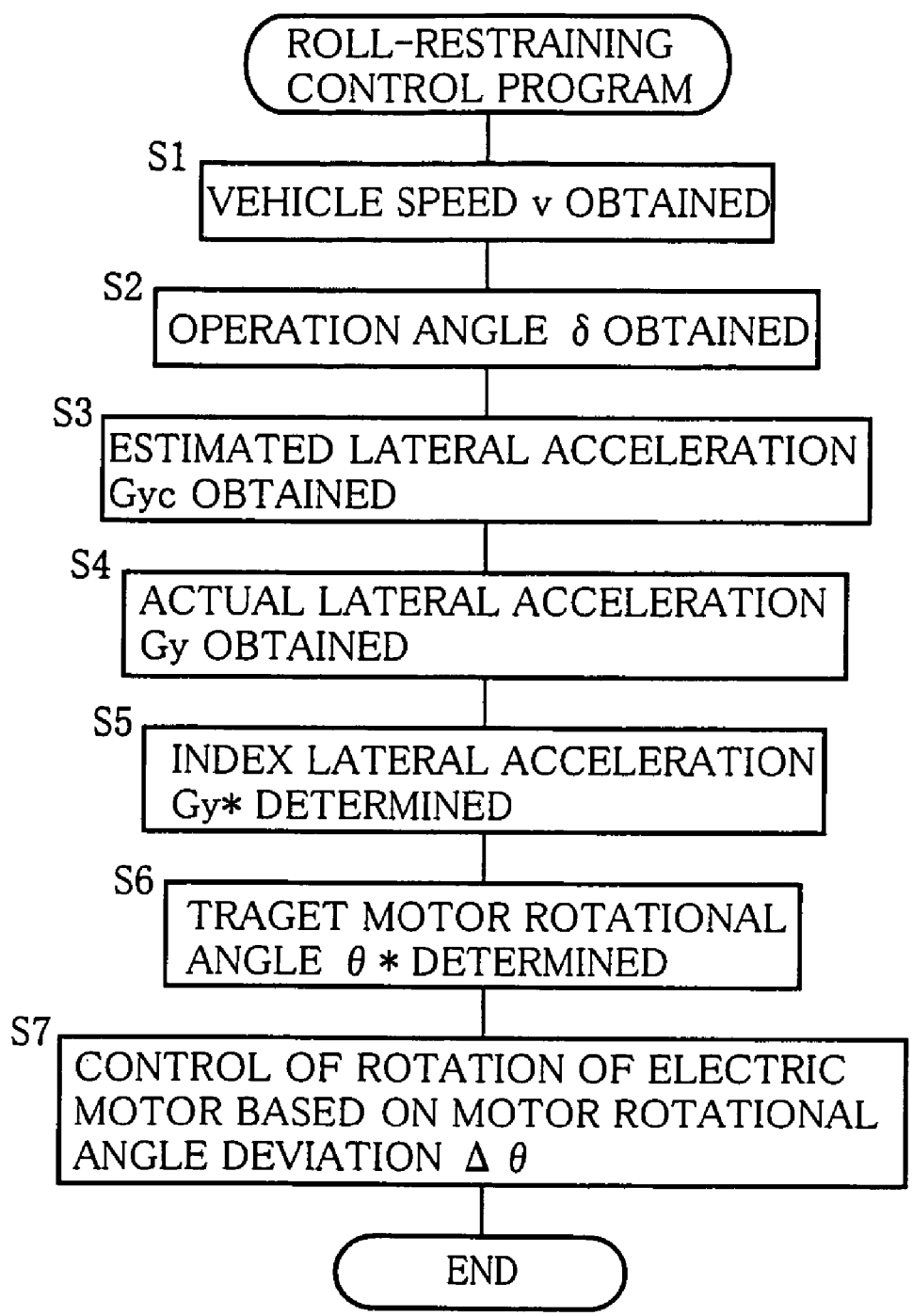
FIG. 7 is a flow chart showing a roll-restraining control program executed in the stabilizer system of FIG. 1.

In the present stabilizer system 10, the roll-restraining control, namely, the control for actively restraining rolling of the vehicle body is carried out under the control mode explained above. The roll-restraining control is carried out such that a roll-restraining control program shown in a flow chart of FIG. 7 is executed in the ECU 110 at short time intervals (e.g., time intervals ranging from ten to several tens of milliseconds). It is noted that the roll-restraining control program is executed only for a time period during which the operation mode of the electric motor 70 is placed in the control mode. It is further noted that a portion of the ECU 110 that executes the roll-restraining control program corresponds to the operation controlling portion 142 described above.

In the roll-restraining control, a vehicle speed v is initially obtained in step S1 (hereinafter "step" is omitted where appropriate) on the basis of a detected value of the vehicle-speed sensor 122. Next, in S2, there is obtained, as a steering amount, an operation angle δ of a steering wheel on the basis of a detected value of the operation-angle sensor 120. S2 is followed by S3 in which estimated lateral acceleration Gyc is obtained on the basis of the obtained vehicle speed v and operation angle δ. For the estimated lateral acceleration Gyc, there is formed in advance a map using vehicle speed and operation angle as variables based on vehicle characteristics. The ECU 110 stores data indicative of the map. The estimated lateral acceleration Gyc is obtained in S3 referring to the map data.

Subsequently, in S4, there is obtained actual lateral acceleration Gy that is lateral acceleration actually generated in the vehicle, on the basis of a detected value of the lateral-acceleration sensor 124. S4 is followed by S5 in which there is determined index lateral acceleration Gy* that is utilized as an index in the roll-restraining control, on the basis of the estimated lateral acceleration Gyc and the obtained actual lateral acceleration Gy. More specifically, the index lateral acceleration Gy* is determined according to the following formula:

$$Gy^* = K_1 \cdot Gyc + K_2 \cdot Gy$$

wherein $K_1$ and $K_2$ indicate gains and are variables using vehicle speed, steering speed, etc., as parameters.

S5 is followed by S6 in which a target motor rotational angle θ* of the electric motor 70 is determined based on the index lateral acceleration Gy* determined in S5. Described in detail, it is possible to get, on the basis of the index lateral acceleration Gy*, elastic force to be exerted by the stabilizer bar 20 to cancel rolling moment generated by the index lateral acceleration Gy*, whereby it is possible to get a relative rotational angle of the pair of stabilizer bar members 22, 24. In the actuator 30 constructed as described above, the relative rotational angle has correspondence with the rotational angle of the electric motor 70, so that it is possible to determined the target motor rotational angle θ* which is a target rotational angle of the electric motor 70. The ECU 110 stores map data of the target motor rotational angle θ* using index lateral acceleration Gy* as a variable. Actually, the target motor rotational angle θ* is determined referring to the map data.

Subsequently, in S7, the rotation of the electric motor 70 is controlled on the basis of the determined target motor rotational angle θ*. In detail, the rotating direction of the electric motor 70 and the amount of the current to be supplied to the motor 70 are determined on the basis of a motor rotational angle deviation $\Delta\theta$ between an actual motor rotational angle $\theta$ detected by the motor rotational angle sensor 100 and the target motor rotational angle $\theta^*$. Information indicative of the rotating direction and the current-supply amount are fed as a command to the corresponding inverter 104. The inverter 104 controls the corresponding motor 70 to be rotated so as to establish the commanded rotating direction and the current-supply amount.

The above explanation of the roll-restraining control merely states an outline of the contents of the control. In the present stabilizer system 10, two stabilizer apparatuses 14 are provided, and the roll-restraining control described above is practiced for each of the two stabilizer apparatuses 14. Actually, various complicated processing is carried out such as a determination of the target motor rotational angles $\theta^*$ that are target values for the control in the respective two apparatuses 14, which determination takes into consideration roll stiffness distribution between the front and rear wheels, etc., However, because the roll-restraining control per se is not directly related to the claimable invention, its explanation is limited to brief one described above.

5. Changing of Operation Mode of Electric Motor

The changing of the operation mode of the electric motor 70 is carried out such that the operation-mode-changing programs are executed by the ECU 110. In the present stabilizer system 10, nine programs shown in respective flow charts of FIGS. 8-16 are prepared as the operation-mode-changing programs. Any of the nine programs is executed as a result of arbitrary selection by the vehicle driver. All of the nine programs are executed at considerably short time intervals (e.g., time intervals ranging from ten to several tens of milliseconds) with an ignition switch placed in an ON state. In some cases, the selected program is executed in parallel with the previously explained roll-restraining control program by time sharing. The nine programs have respective inherent or peculiar characteristics. Accordingly, the characteristic of the vehicle, in detail, the characteristic of the stabilizer apparatus varies depending upon the kind of the programs to be executed. Hereinafter, various operation-mode-changing arrangements by the respective nine programs will be explained referring to the respective flow charts.

(a) First Operation-Mode-Changing Arrangement

Figure 8:
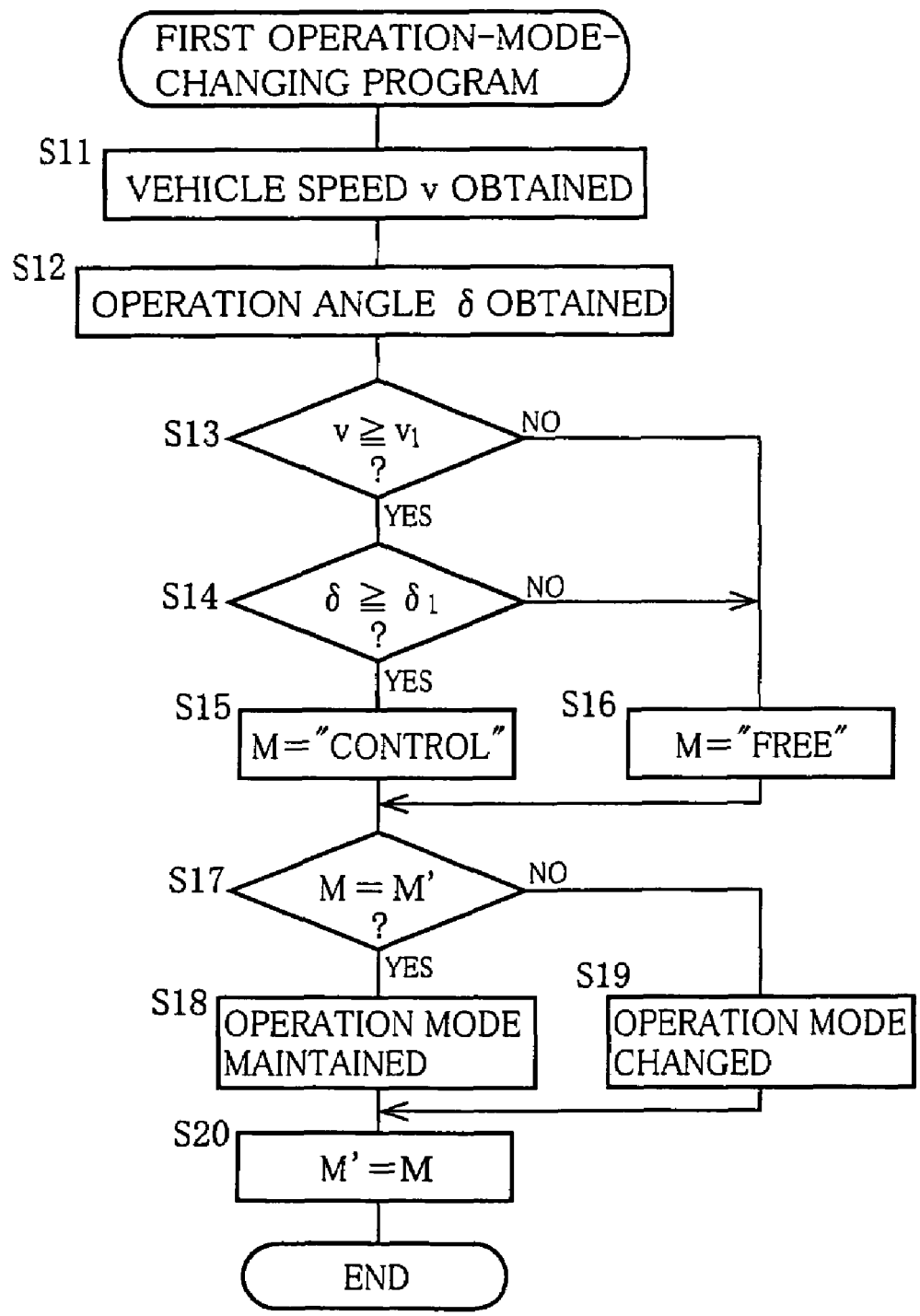
FIG. 8 is a flow chart showing a first operation-mode-changing program executed in the stabilizer system of FIG. 1.

A first operation-mode-changing arrangement is an arrangement in which a first operation-mode-changing program shown in FIG. 8 is executed. According to processing of this program, a vehicle speed v is initially detected in S11 on the basis of a detected value of the vehicle-speed sensor 122. Next, in S12, an operation angle $\delta$ of the steering wheel is obtained on the basis of a detected value of the operation-angle sensor 120. S13 is then implemented to judge whether the vehicle speed v is not smaller than a threshold speed $v_1$. Where the vehicle speed v is judged to be not smaller than the threshold $v_1$ in S13, S14 is implemented to judge whether the operation angle $\delta$ is not smaller than a threshold angle $\delta_1$ (which is one kind of a threshold steering amount). Where the operation angle $\delta$ is judged to be not smaller than a threshold angle $\delta_1$ in S14, S15 is implemented to determine a current mode M (i.e., an operation mode determined by the current execution of the program) to be "the control mode". On the contrary, where the vehicle speed v is judged to be smaller than the threshold speed $v_1$ in S13 and where the operation angle $\delta$ is judged to be smaller than the threshold angle $\delta_1$ in S 14, the control flow goes to S16 in which the current mode M is determined to be "the free mode". After determination of the current mode M, S17 is implemented to judge whether the current mode M is identical with a previous mode M' (i.e., an operation mode determined by the previous execution of the program). Where the current mode M is identical with the previous mode M', the control flow goes to S18 in which the operation mode of the electric motor 70 is maintained. Where the current mode M differs from the previous mode M', the control flow goes to S19 in which the operation mode of the motor 70 is changed to the current mode M determined in the currently executed program. Namely, a signal for maintaining or changing the operation mode is outputted to the inverter 104. After implementation of S18 or S19, S20 is implemented to perform processing for updating the previous mode M' to the current mode M. Thus, one execution of the first operation-mode-changing program is completed.

As a result of a series of processing executed by the first operation-mode-changing program, under the first operation-mode-changing arrangement, the operation mode of the electric motor 70 is determined to be the control mode where the vehicle speed is high and the steering amount is large, for thereby carrying out the roll-restraining control, whereas the operation mode of the electric motor 70 is determined to be the free mode as the non-control mode where the vehicle speed is low and where the steering amount is small. In this connection, the threshold speed vi is set at a level (e.g., 20-30 km/h) at which large rolling does not occur even upon turning of the vehicle while the threshold operation angle $\delta_1$ is set at a level corresponding to a steering amount at which large rolling does not occur even upon running of the vehicle at a comparatively high speed. According to this first operation-mode-changing arrangement, in a situation wherein the rolling is comparatively large, the rolling can be effectively restrained. At the same time, in a situation wherein the rolling is comparatively small, the stabilizer apparatus 14 is not allowed to exhibit a function of a stabilizer in response to the reverse input action from the road surface, whereby the ride comfort of the vehicle is given priority.

The previously explained operation-mode changing portion 140 is constituted by including a portion of the ECU 110 that executes the processing according to the first operation-mode-changing program. The vehicle-speed-depending determining portion 144 is constituted by including a portion of the ECU 110 that executes the judging processing at S13 and the processing of determining the operation mode based on the result of judgment. The steering-amount-dependent determining portion 146 is constituted by including a portion of the ECU 110 that executes the judging processing at S14 and the processing of determining the operation mode based on the result of judgment. In this first operation-mode-changing arrangement, the vehicle-speed-dependent determining portion 144 and the steering-amount-dependent determining portion 146 cooperate with each other to determine the operation mode of the electric motor 70.

In the following second through ninth operation-mode-changing arrangements, respective programs similar to the first operation-mode-changing program are executed. Accordingly, in the following explanation of those programs and respective processing by those programs, portions of those programs which are identical to the aforementioned first operation-mode-changing program are not explained. In each of the following operation-mode-changing arrangements, too, the operation-mode changing portion 140 is constituted by including a portion of the ECU 110 that executes processing according to the implemented operation-mode-changing program. Similarly, the vehicle-speed-dependent determining portion 144 is constituted by including a portion of the ECU 110 that executes the judging processing based on the vehicle speed and the processing of determining the operation mode based on the result of judgment while the steering-amount-dependent determining portion 146 is constituted by including a portion of the ECU 110 that executes the judging processing based on the steering amount and the processing of determining the operation mode based on the result of judgment. Therefore, explanation as to which portion of the ECU 110 constitutes the vehicle-speed-dependent determining portion 144 or the steering-amount-dependent determining portion 146 is dispensed with in the interest of brevity.

(b) Second Operation-Mode-Changing Arrangement

Figure 9:
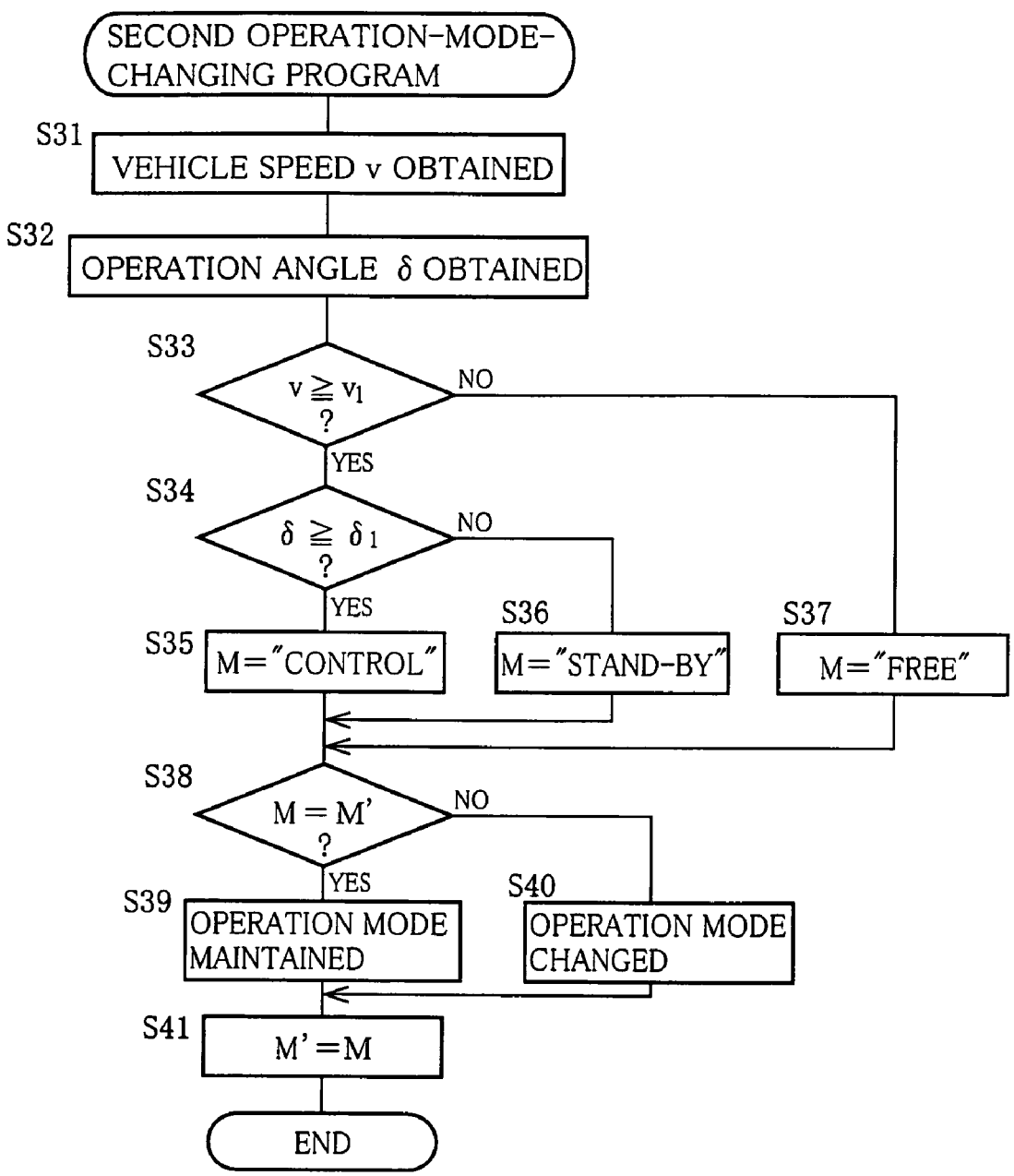
FIG. 9 is a flow chart showing a second operation-mode-changing program executed in the stabilizer system of FIG. 1.

A second operation-mode-changing arrangement is an arrangement in which a second operation-mode-changing program shown in FIG. 9 is executed. This second operation-mode-changing arrangement differs from the first operation-mode-changing arrangement in that the stand-by mode is selected where the vehicle speed is high and the steering amount is small. Hence, in this arrangement, the ride comfort of the vehicle is somewhat inferior where the vehicle speed is high and the steering amount is small. This arrangement, however, assures good readiness or responsiveness of the stabilizer apparatus 14 when the roll-restraining control is executed as a result of an increase in the steering amount at the high-speed running of the vehicle.

(c) Third Operation-Mode-Changing Arrangement

Figure 10:
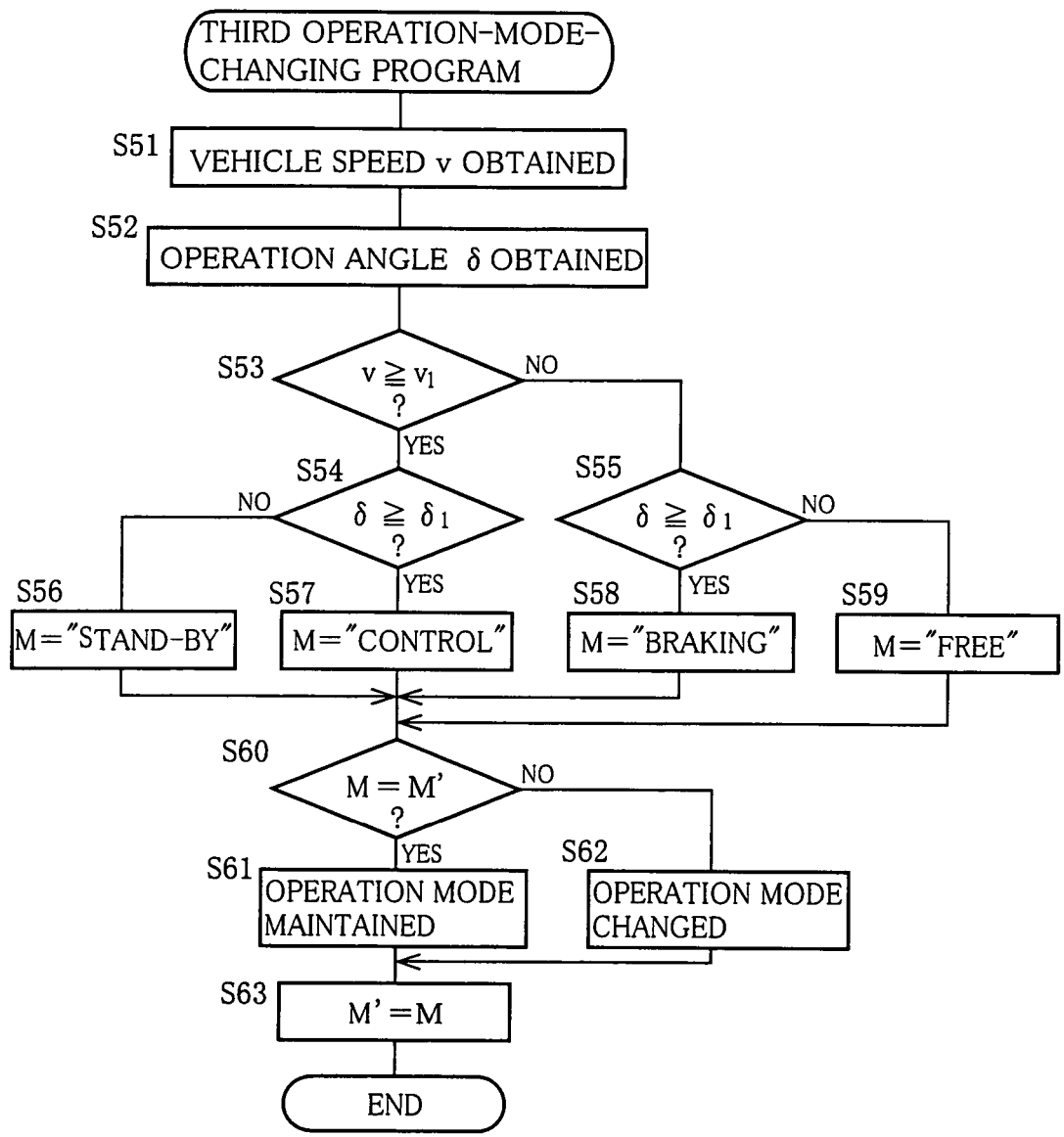
FIG. 10 is a flow chart showing a third operation-mode-changing program executed in the stabilizer system of FIG. 1.

A third operation-mode-changing arrangement is an arrangement in which a third operation-mode-changing program shown in FIG. 10 is executed. In this third operation-mode changing arrangement, the operation mode is changeable among the aforementioned four operation modes. As in the second operation-mode-changing arrangement explained above, during high-speed running of the vehicle, the control mode is selected for executing the roll-restraining control where the steering amount is large whereas the stand-by mode is selected where the steering amount is small. Unlike the second operation-mode-changing arrangement, this third operation-mode-changing arrangement is arranged such that, during low-speed running of the vehicle, the braking mode is selected where the steering amount is large whereas the free mode is selected where the steering amount is small. Accordingly, where the vehicle speed is low and the steering amount is large, the braking mode is selected, thereby assuring the roll-restraining effect as large as that in the conventional stabilizer. In this connection, the control mode may be employed in place of the braking mode where the vehicle speed is low and the steering amount is large, though this modified arrangement does not belong to the third operation-mode-changing arrangement.

(d) Fourth Operation-Mode-Changing Arrangement

Figure 11:
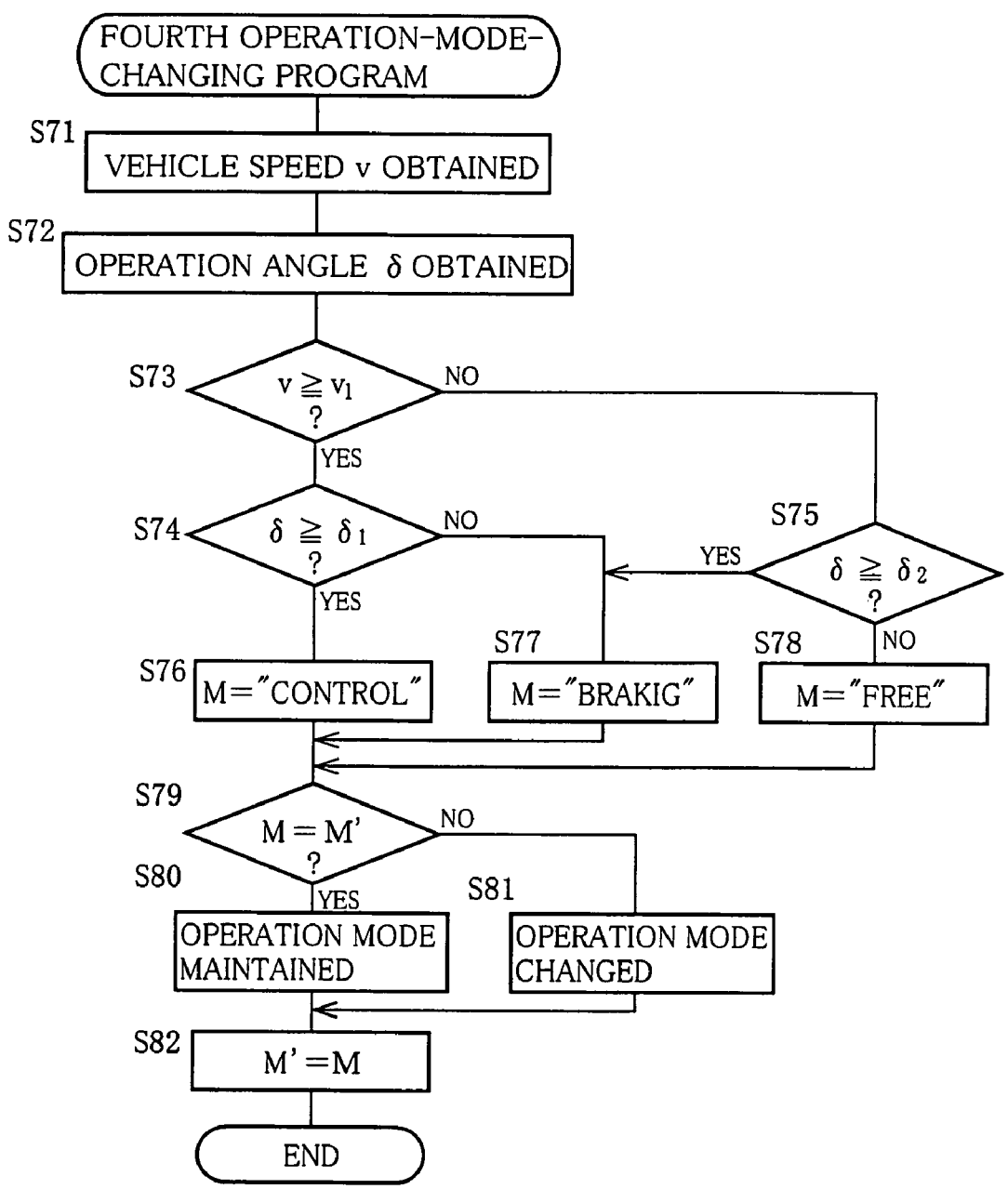
FIG. 11 is a flow chart showing a fourth operation-mode-changing program executed in the stabilizer system of FIG. 1.

A fourth operation-mode-changing arrangement is an arrangement in which a fourth operation-mode-changing program shown in FIG. 11 is executed. As in the above-mentioned operation-mode-changing arrangements, in this fourth operation-mode-changing arrangement, the control mode is selected where the vehicle speed is high and the steering amount is large and the free mode is selected where the vehicle speed is low and the steering amount is small. This fourth operation-mode-changing arrangement differs from the above-mentioned operation-mode-changing arrangements in that the braking mode is selected where the vehicle speed is high and the steering amount is small and where the vehicle speed is low and the steering amount is large.

Further, in this fourth operation-mode-changing arrangement, the threshold steering amount, i.e., the threshold operation angle $\delta_1$ used for judgment of the steering amount at high-speed running (at S74) and the threshold steering amount, i.e., the threshold operation angle $\delta_2$ used for judgment of the steering amount at low-speed running (at S75) are made different from each other. In detail, the threshold operation angle $\delta_1$ is made larger than the threshold operation angle $\delta_2$ ($\delta_1 > \delta_2$). The amount of rolling of the vehicle body depends on the vehicle speed and the steering amount. The amount of rolling of the vehicle body increases with an increase in the vehicle speed. The amount of rolling of the vehicle body increases with an increase in the steering amount. Therefore, because the threshold operation angle $\delta_1$ is made larger than the threshold operation angle $\delta_2$ ($\delta_1 > \delta_2$), the operation mode is prevented from being changed between the control mode and the free mode where the vehicle speed v changes across the threshold speed $v_1$ upon turning of the vehicle under a constant steering amount in which the operation angle $\delta$ is in a range from $\delta_1$ to $\delta_2$, for instance. Accordingly, this arrangement prevents changing of the operation mode between those having a great gap or difference therebetween. In other words, this arrangement effectively avoids so-called "hunting". In this connection, to employ the mutually different threshold steering amounts respectively in the judgment of the steering amount at S74 and in the judgment of the steering amount at S75 may be conceived that the threshold steering amount is changed depending upon the vehicle speed. Hence, the threshold changing portion 150 is constituted by including a portion of the ECU 110 that executes the processing of making the threshold used in the processing at S74 and the threshold used in the processing at S75 different from each other.

In the fourth operation-mode-changing arrangement, the threshold steering amount is varied depending upon the vehicle speed. This arrangement may be modified, for instance, as follows: The judgment of the steering amount precedes the judgment of the vehicle speed, and the threshold speed used in the judgment of the vehicle speed where the steering amount is large and the threshold speed used in the judgment of the vehicle speed where the steering amount is small are made different from each other, thus reducing a control gap upon turning of the vehicle during running at a constant speed, for instance.

(e) Fifth Operation-Mode-Changing Arrangement

Figure 12:
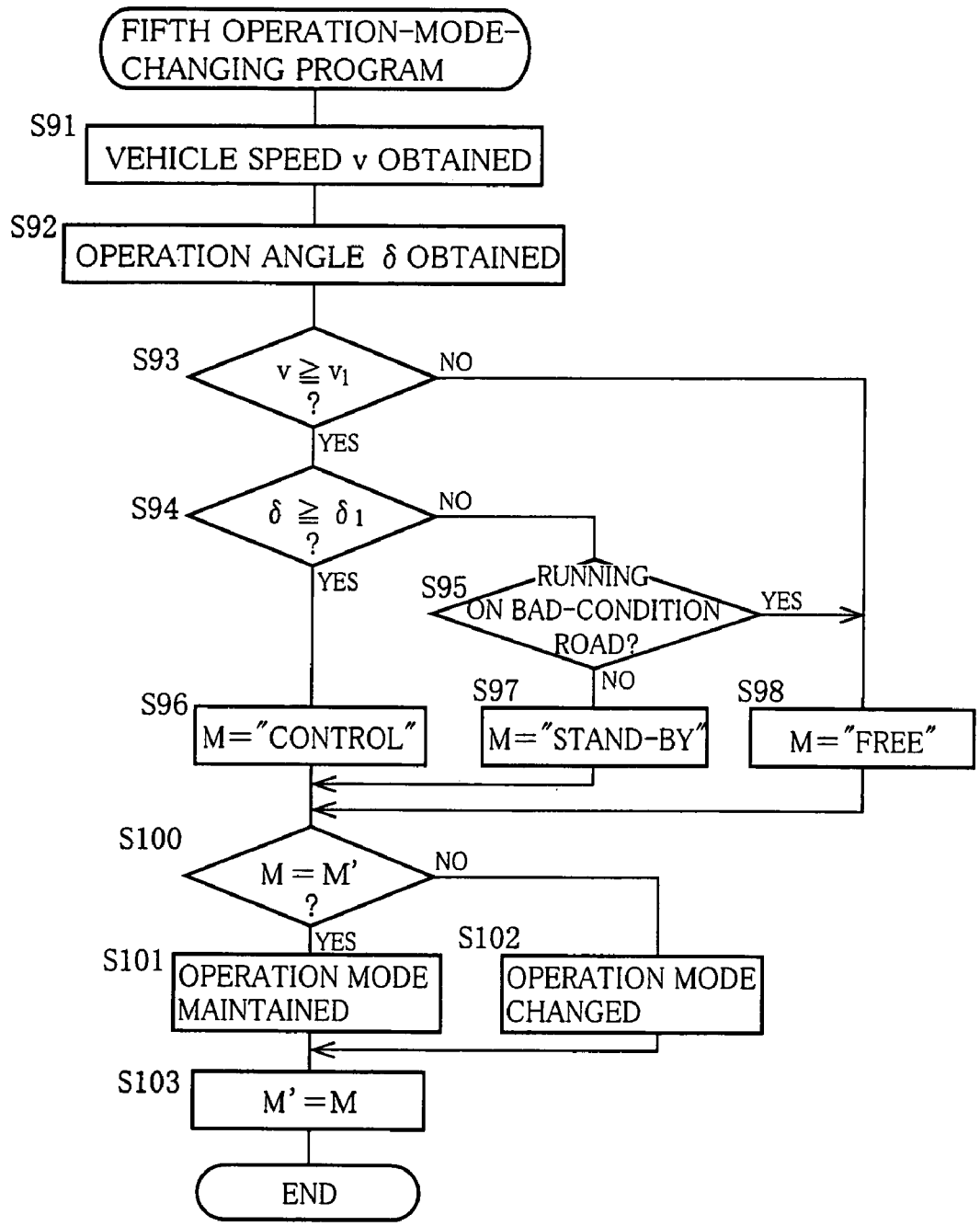
FIG. 12 is a flow chart showing a fifth operation-mode-changing program executed in the stabilizer system of FIG. 1.

A fifth operation-mode-changing arrangement is an arrangement in which a fifth operation-mode-changing program shown in FIG. 12 is executed. In this fifth operation-mode-changing arrangement, the operation mode is changed depending upon whether the vehicle is running on a bad-condition road such as a bumpy road, a mogul road, or the like. Described more specifically, where the vehicle speed is high and the steering amount is small, it is judged at S95 whether vehicle is running on the bad-condition road. Where it is judged that the vehicle is running on the bad-condition road, the free mode is selected as the operation mode. On the other hand, it is judged that the vehicle is not running on the bad-condition road, the stand-by mode is selected. In the judgment of running of the vehicle on the bad-condition road, there is initially obtained vertical acceleration Gt on the basis of a detected value of the vertical acceleration sensor 124. Based on the obtained vertical acceleration Gt and a set of vertical acceleration Gt which had been obtained in the previous execution of this program prior to the current execution of the program, it is judged that the vehicle is running on the bad-condition road if a degree of change in the vertical acceleration Gt satisfies a predetermined condition. As an algorithm for the judgment of the running of the vehicle on the bad-condition road, any known one may be employed and therefore a detailed explanation of the algorithm is not given here. In the present arrangement, a so-called "wavy" road is judged as the bad-condition road.

In this fifth operation-mode-changing arrangement, the free mode is selected during running on the bad-condition road, thereby assuring good riding comfort of the vehicle while running on the bad-condition road. In this arrangement, where the vehicle speed is low, the free mode is selected irrespective of whether the vehicle is running on the bad-condition road or not. Further, since it is conceivable that, during running on the bad-condition road, a large steering operation is hardly made at a high speed, this fifth operation-mode-changing arrangement widely deals with the running on the bad-condition road. In this arrangement, the road-surface-condition-dependent determining portion 148 is constituted by including a portion of the ECU 110 that executes the judging processing at S95 and the processing of determining the operation mode based on the result of judgment.

(f) Sixth Operation-Mode-Changing Arrangement

Figure 13:
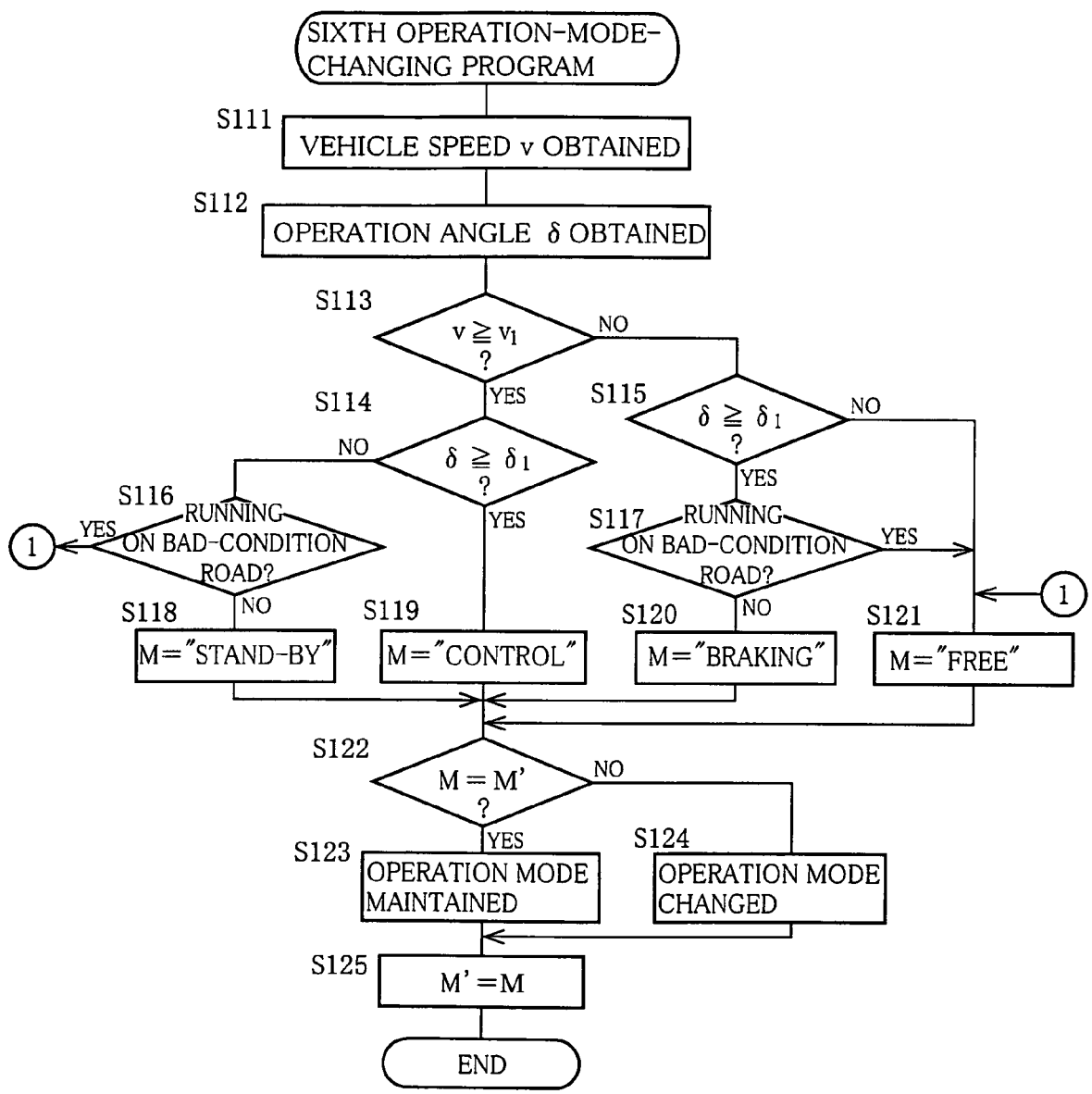
FIG. 13 is a flow chart showing a sixth operation-mode-changing program executed in the stabilizer system of FIG. 1.
Figure 14:
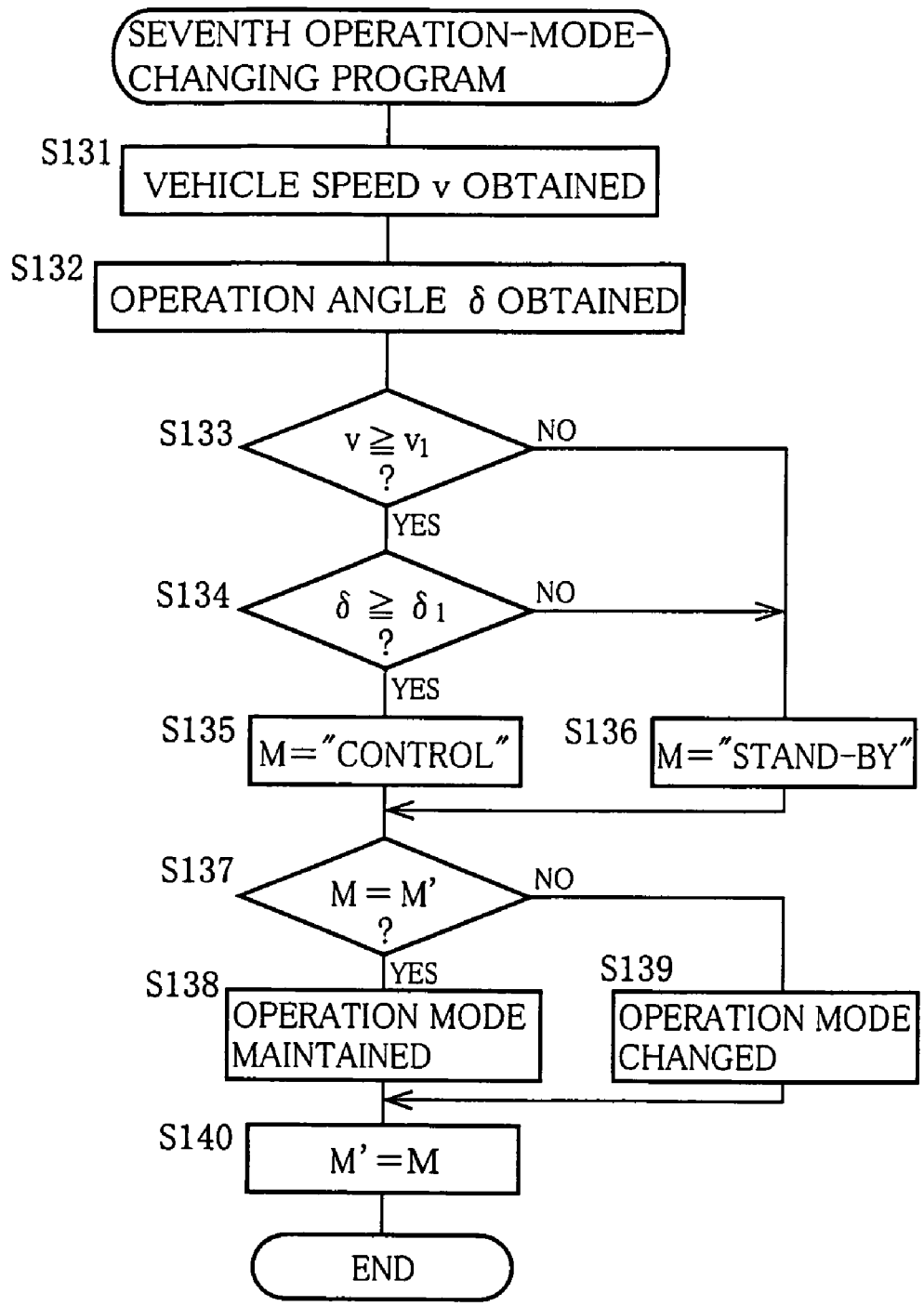
FIG. 14 is a flow chart showing a seventh operation-mode-changing program executed in the stabilizer system of FIG. 1.

A sixth operation-mode-changing arrangement is an arrangement in which a sixth operation-mode-changing program shown in FIG. 13 is executed. This sixth operation-mode-changing arrangement is an arrangement in which changing of the operation mode based on the judgment of running on the bad-condition road is added to the previously explained third operation-mode-changing arrangement. More specifically described, in this sixth operation-mode-changing arrangement, S116 is implemented to judge whether the vehicle is running on the bad-condition road where the vehicle speed is high and the steering amount is small while S117 is implemented to judge whether the vehicle is running on the bad-condition road where the vehicle speed is low and the steering amount is large. Where it is judged that the vehicle is running on the bad-condition road in each of the judgment at S116 and S117, the operation mode of the electric motor 70 is determined to be the free mode. Like the fifth operation-mode-changing arrangement, this sixth operation-mode-changing arrangement gives priority to the ride comfort of the vehicle during running on the bad-condition road. In this arrangement, the road-surface-condition-dependent determining portion 148 is constituted by including a portion of the ECU 110 that executes the judging processing at S116, S117 and the processing of determining the operation mode based on the result of judgment.

(g) Seventh Operation-Mode-Changing Arrangement

This seventh operation-mode-changing arrangement is an arrangement in which the free mode is replaced with the stand-by mode in the aforementioned first operation-mode-changing arrangement. Because the stand-by mode permits the regeneration of the electromotive force as explained above, this seventh operation-mode-changing arrangement realizes the stabilizer system 10 that assures good power efficiency, in other words, excellent power-saving characteristics.

(h) Eighth Operation-Mode-Changing Arrangement

Figure 15:
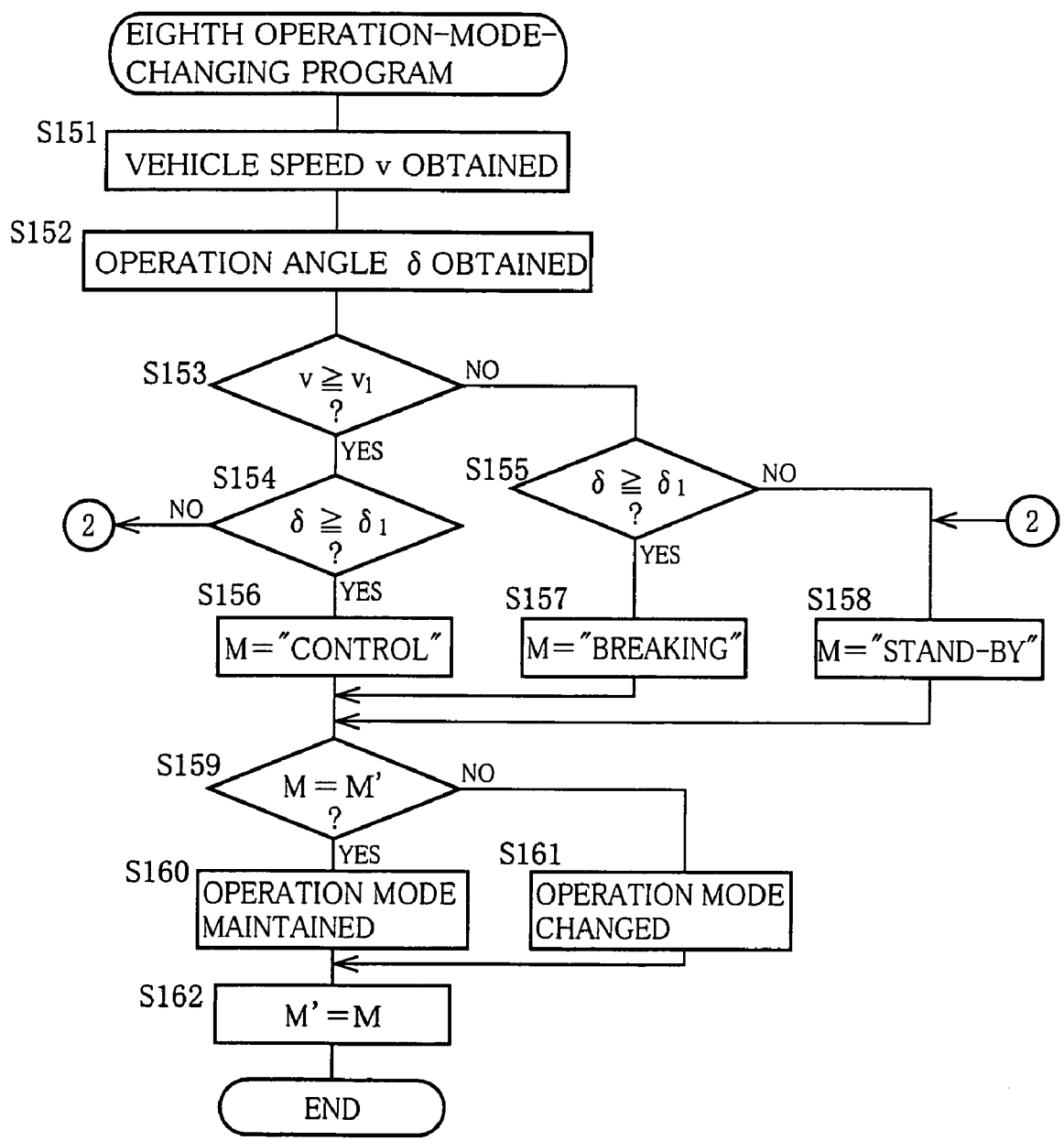
FIG. 15 is a flow chart showing an eighth operation-mode-changing program executed in the stabilizer system of FIG. 1.

An eighth operation-mode-changing arrangement is an arrangement in which an eighth operation-mode-changing program shown in FIG. 15 is executed. In this eighth operation-mode-changing arrangement, the free mode is replaced with the stand-by mode in the aforementioned third operation-mode-changing arrangement. As explained above with respect to the seventh operation-mode-changing arrangement, this eighth operation-mode-changing arrangement realizes the stabilizer system 10 that assures excellent power-saving characteristics.

(i) Ninth Operation-Mode-Changing Arrangement

Figure 16:
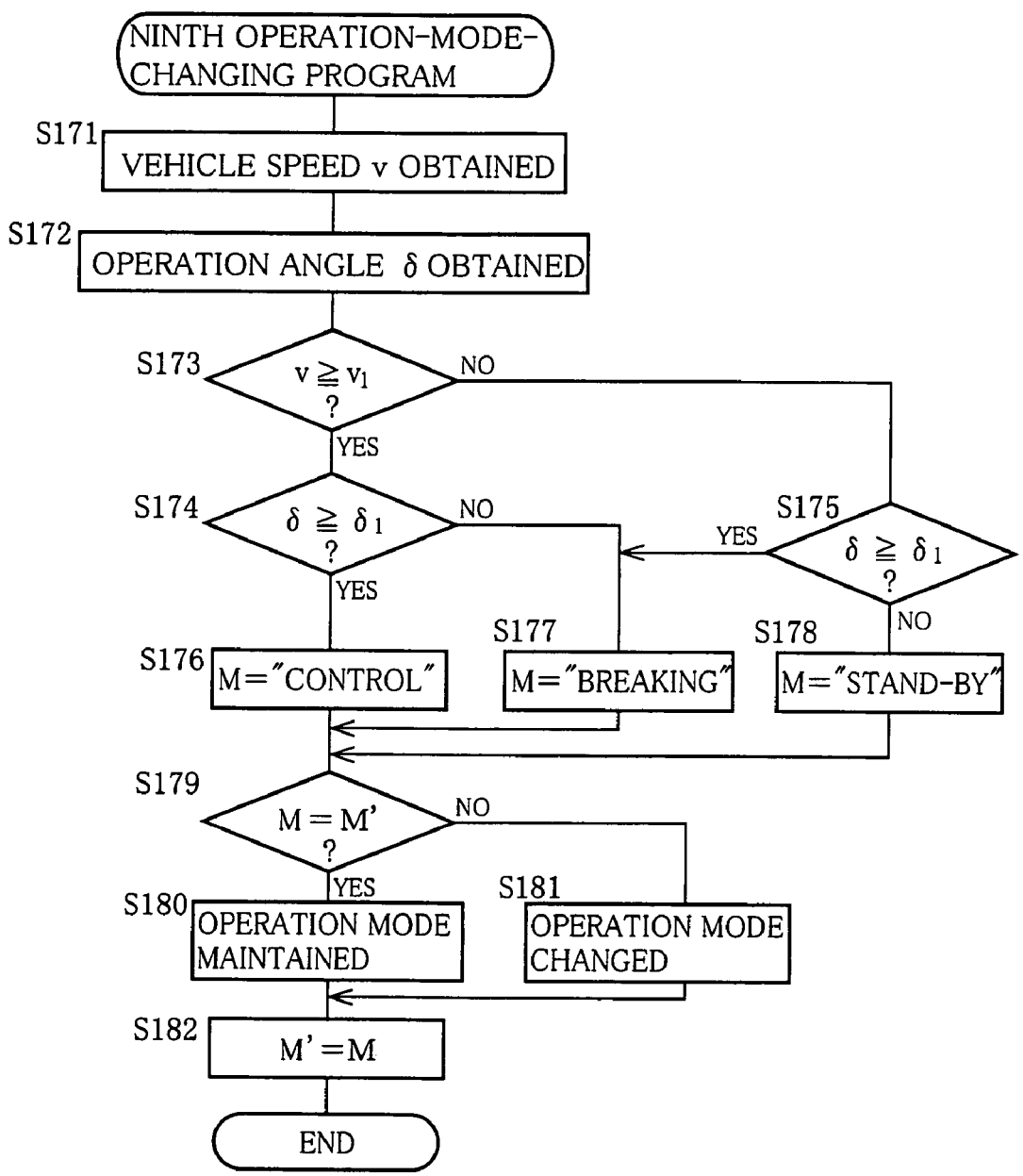
FIG. 16 is a flow chart showing a ninth operation-mode-changing program executed in the stabilizer system of FIG. 1.

A ninth operation-mode-changing arrangement is an arrangement in which a ninth operation-mode-changing program shown in FIG. 16 is executed. In this ninth operation-mode-changing arrangement, the free mode is replaced with the stand-by mode in the aforementioned fourth operation-mode-changing arrangement. As explained above with respect to the seventh and eighth operation-mode-changing arrangements, this ninth operation-mode-changing arrangement realizes the stabilizer system 10 that assures excellent power-saving characteristics.

What is claimed is:

1. A stabilizer system for a vehicle comprising:
   a stabilizer bar connected to left and right wheels at respective opposite ends thereof;
   an actuator which has an electric motor and which changes elastic force to be exhibited by the stabilizer bar, as a result of control of an operation of the electric motor; and
   a control device which controls the operation of the electric motor;
   wherein the control device includes an operation-mode changing portion which changes an operation mode of the electric motor that depends on a motor-phase-connecting formation and a power-supply status of the electric motor, on the basis of at least one of a vehicle running state and a road surface condition;
   wherein the operation-mode changing portion includes a vehicle-speed-dependent determining portion which determines the operation mode of the electric motor to be changed, on the basis of a running speed of the vehicle as the vehicle running state, and
   wherein the vehicle-speed-dependent determining portion determines the operation mode of the electric motor to be a free mode, wherein the motor-phase-connecting formation is a formation in which electric power is inhibited from being supplied to phases of the electric motor, when the running speed of the vehicle is smaller than a predetermined threshold speed.

2. The stabilizer system according to claim 1, wherein the operation-mode changing portion changes the operation mode of the electric motor between a control mode, wherein the motor-phase-connecting formation is a formation in which the operation of the electric motor is controllable and wherein electric power is supplied to the electric motor and a non-control mode, wherein the control of the operation of the electric motor is not executed by the control device.

3. The stabilizer system according to claim 2, wherein the operation-mode changing portion changes the operation mode of the electric motor between the control mode and one of operation modes each as the non-control mode selected from:
   a stand-by mode, wherein the motor-phase-connecting formation is a formation in which the operation of the electric motor is controllable and electric power is not supplied to the electric motor;
   a braking mode, wherein the motor-phase-connecting formation is a formation in which phases of the electric motor are connected to each other; and
   a free mode, wherein the motor-phase-connecting formation is a formation in which electric power is inhibited from being supplied to phases of the electric motor.

4. The stabilizer system according to claim 1, wherein the operation-mode changing portion includes a steering-amount-dependent determining portion which determines the operation mode of the electric motor to be changed, on the basis of a steering amount of the vehicle as the vehicle running state.

5. The stabilizer system according to claim 1, wherein the operation-mode changing portion includes a road-surface-condition-dependent determining portion which determines the operation mode of the electric motor to be changed, on the basis of the road surface condition.

6. The stabilizer system according to claim 5, wherein the road-surface-condition-dependent determining portion determines the operation mode of the electric motor to be a free mode, wherein the motor-phase-connecting formation is a formation in which electric power is inhibited from being supplied to phases of the electric motor, when the road surface condition is bad.

7. The stabilizer system according to claim 1, wherein the electric motor is a DC brushless motor.

8. The stabilizer system according to claim 1, further comprising:
 a power source device constituted by including an inverter, for supplying electric power to the electric motor;
 wherein the operation mode of the electric motor is changed by changing switching elements of the inverter.

9. A stabilizer system, comprising:
 a stabilizer bar connected to left and right wheels at respective opposite ends thereof;
 an actuator which has an electric motor and which changes elastic force to be exhibited by the stabilizer bar, as a result of control of an operation of the electric motor; and
 a control device which controls the operation of the electric motor;
 wherein the control device includes an operation-mode changing portion which changes an operation mode of the electric motor that depends on a motor-phase-connecting formation and a power-supply status of the electric motor, on the basis of at least one of a vehicle running state and road surface condition;
 the operation-mode changing portion includes:
  a vehicle-speed-dependent determining portion which determines the operation mode of the electric motor to be changed, on the basis of a running speed of the vehicle as the vehicle running state; and
  a steering-amount-dependent determining portion which determines the operation mode of the electric motor to be changed, on the basis of a steering amount of the vehicle as the vehicle running state; and
 the vehicle-speed-dependent determining portion determines the operation mode of the electric motor to be changed, by comparison between the running speed of the vehicle and a predetermined threshold speed, and the steering-amount-dependent determining portion determines the operation mode of the electric motor to be changed, by comparison between the steering amount of the vehicle and a predetermined threshold steering amount.

10. A stabilizer system, comprising:
 a stabilizer bar connected to left and right wheels at respective opposite ends thereof;
 an actuator which has an electric motor and which changes elastic force to be exhibited by the stabilizer bar, as a result of control of an operation of the electric motor; and
 a control device which controls the operation of the electric motor;
 wherein the control device includes an operation-mode changing portion which changes an operation mode of the electric motor that depends on a motor-phase-connecting formation and a power-supply status of the electric motor, on the basis of at least one of a vehicle running state and road surface condition;
 the operation-mode changing portion includes:
  a vehicle-speed-dependent determining portion which determines the operation mode of the electric motor to be changed, on the basis of a running speed of the vehicle as the vehicle running state; and
  a steering-amount-dependent determining portion which determines the operation mode of the electric motor to be changed, on the basis of a steering amount of the vehicle as the vehicle running state; and
 the operation-mode changing portion is arranged such that the vehicle-speed-dependent determining portion and the steering-amount-dependent determining portion determine the operation mode of the electric motor to be changed to be:
 a free mode, wherein the motor-phase-connecting formation is a formation in which electric power is inhibited from being supplied to phases of the electric motor, when the steering amount of the vehicle is smaller than a predetermined threshold steering amount and the running speed of the vehicle is smaller than a predetermined threshold speed; and
 a stand-by mode, wherein the motor-phase-connecting formation is a formation in which the operation of the electric motor is controllable and electric power is not supplied to the electric motor, when the steering amount of the vehicle is smaller than the predetermined threshold steering amount and the running speed of the vehicle is not smaller than the predetermined threshold speed.

11. A stabilizer system, comprising:
 a stabilizer bar connected to left and right wheels at respective opposite ends thereof;
 an actuator which has an electric motor and which changes elastic force to be exhibited by the stabilizer bar, as a result of control of an operation of the electric motor; and
 a control device which controls the operation of the electric motor;
 wherein the control device includes an operation-mode changing portion which changes an operation mode of the electric motor that depends on a motor-phase-connecting formation and a power-supply status of the electric motor, on the basis of at least one of a vehicle running state and road surface condition;
 the operation-mode changing portion includes:
  a vehicle-speed-dependent determining portion which determines the operation mode of the electric motor to be changed, on the basis of a running speed of the vehicle as the vehicle running state; and
  a steering-amount-dependent determining portion which determines the operation mode of the electric motor to be changed, on the basis of a steering amount of the vehicle as the vehicle running state; and
 the operation-mode changing portion is arranged such that the vehicle-speed-dependent determining portion and the steering-amount-dependent determining portion determine the operation mode of the electric motor to be changed to be:
 a braking mode, wherein the motor-phase-connecting formation is a formation in which phases of the electric motor are connected to each other, when the steering amount of the vehicle is not smaller than a predetermined threshold steering amount and the running speed of the vehicle is smaller than a predetermined threshold speed; and a control mode, wherein the motor-phase-connecting formation is a formation in which the operation of the electric motor is controllable and electric power is supplied to the electric motor, when the steering amount of the vehicle is not smaller than the predetermined threshold steering amount and the running speed of the vehicle is not smaller than the predetermined threshold speed.

12. A stabilizer system, comprising:

a stabilizer bar connected to left and right wheels at respective opposite ends thereof;

an actuator which has an electric motor and which changes elastic force to be exhibited by the stabilizer bar, as a result of control of an operation of the electric motor; and a control device which controls the operation of the electric motor;

wherein the control device includes an operation-mode changing portion which changes an operation mode of the electric motor that depends on a motor-phase-connecting formation and a power-supply status of the electric motor, on the basis of at least one of a vehicle running state and road surface condition;

the operation-mode changing portion includes:

a vehicle-speed-dependent determining portion which determines the operation mode of the electric motor to be changed, on the basis of a running speed of the vehicle as the vehicle running state; and a steering-amount-dependent determining portion which determines the operation mode of the electric motor to be changed, on the basis of a steering amount of the vehicle as the vehicle running state; and the operation-mode changing portion includes a threshold changing portion which changes at least one of the threshold steering amount and the threshold speed which is set for one of the steering amount of the vehicle and the running speed of the vehicle, on the basis of the other of the steering amount of the vehicle and the running speed of the vehicle.

* * * * *